US012378497B2

(12) United States Patent
Zhang et al.

(10) Patent No.: US 12,378,497 B2
(45) Date of Patent: Aug. 5, 2025

(54) POLYPROPYLENE VISCOSITY MODIFIERS AND LUBRICATING OILS THEREOF

(71) Applicant: ExxonMobil Technology and Engineering Company, Baytown, TX (US)

(72) Inventors: Jingwen Zhang, Houston, TX (US); John R. Hagadorn, Houston, TX (US); Jo Ann M Canich, Houston, TX (US); Peijun Jiang, Katy, TX (US)

(73) Assignee: ExxonMobil Chemicals Patents Inc., Baytown, TX (US)

( * ) Notice: Subject to any disclaimer, the term of this patent is extended or adjusted under 35 U.S.C. 154(b) by 0 days.

(21) Appl. No.: 18/704,529

(22) PCT Filed: Oct. 18, 2022

(86) PCT No.: PCT/US2022/046961
§ 371 (c)(1),
(2) Date: Apr. 25, 2024

(87) PCT Pub. No.: WO2023/081010
PCT Pub. Date: May 11, 2023

(65) Prior Publication Data
US 2024/0400930 A1    Dec. 5, 2024

Related U.S. Application Data

(60) Provisional application No. 63/275,996, filed on Nov. 5, 2021.

(51) Int. Cl.
*C10M 143/04* (2006.01)
*C10M 145/14* (2006.01)
(Continued)

(52) U.S. Cl.
CPC ........ *C10M 143/04* (2013.01); *C10M 145/14* (2013.01); *C10M 157/00* (2013.01);
(Continued)

(58) Field of Classification Search
CPC .............. C10M 143/04; C10M 157/00; C10M 169/041; C10M 171/02; C10M 2205/024;
(Continued)

(56) References Cited

U.S. PATENT DOCUMENTS 5,272,003 A    12/1993   Peacock
5,476,914 A  * 12/1995   Ewen .................... C08F 110/06
                                                          526/160
(Continued)

FOREIGN PATENT DOCUMENTS

WO    2000/012594    3/2000
WO    2007/002177    1/2007

OTHER PUBLICATIONS

Derosa, Claudio et al., "Polymorphism of Syndiotactic Polypropylene In Copolymers Of Propylen With Ethylene and 1-butene", Polymer, 1998, pp. 6219-6226, vol. 39 No. 25.
(Continued)

*Primary Examiner* — Ellen M Mcavoy
(74) *Attorney, Agent, or Firm* — ExxonMobil Technology and Engineering Company

(57) ABSTRACT

In some embodiments, a lubricating oil includes at least 50 wt % of a base oil, based on total weight of the lubricating oil. The lubricating oil includes at least 0.1 wt % of a polypropylene homopolymer having a racemic dyad content of about 60% to about 99% and a number average molecular weight (by GPC DRI) of about 10,000 g/mol to about 250,000 g/mol, wherein a total amount of the base oil and the polypropylene homopolymer does not exceed 100 wt %.

29 Claims, 1 Drawing Sheet

(51) Int. Cl.
*C10M 157/00* (2006.01)
*C10M 169/04* (2006.01)
*C10M 171/02* (2006.01)
*C10N 20/02* (2006.01)
*C10N 20/04* (2006.01)
*C10N 30/00* (2006.01)
*C10N 30/02* (2006.01)

(52) U.S. Cl.
CPC ...... *C10M 169/041* (2013.01); *C10M 171/02* (2013.01); *C10M 2205/024* (2013.01); *C10N 2020/02* (2013.01); *C10N 2020/04* (2013.01); *C10N 2030/02* (2013.01); *C10N 2030/68* (2020.05)

(58) Field of Classification Search
CPC ............ C10N 2020/02; C10N 2020/04; C10N 2030/02; C10N 2040/25; C10N 2070/02; C08F 110/06
USPC .......................................................... 508/591
See application file for complete search history.

(56) References Cited

U.S. PATENT DOCUMENTS

| | | | |
|---|---|---|---|
| 6,143,683 A | 11/2000 | Shamshoum | |
| 6,184,326 B1* | 2/2001 | Razavi | C08F 110/06 |
| | | | 526/160 |
| 7,388,051 B2 | 6/2008 | Mori | |
| 7,524,910 B2 | 4/2009 | Jiang | |
| 7,589,145 B2 | 9/2009 | Brant | |
| 7,662,895 B2 | 2/2010 | Brant | |
| 9,045,574 B2 | 6/2015 | Ikeda | |
| 9,382,356 B2 | 7/2016 | Tohi | |
| 10,351,739 B2* | 7/2019 | Tse | C09J 123/16 |
| 10,876,063 B2 | 12/2020 | Dias | |
| 2003/0060584 A1 | 3/2003 | Coates | |
| 2003/0096896 A1 | 5/2003 | Wang | |
| 2005/0070669 A1 | 3/2005 | Sosa | |
| 2006/0029424 A1 | 2/2006 | Kawai | |
| 2006/0057321 A1 | 3/2006 | Mori | |
| 2007/0117941 A1* | 5/2007 | Brant | C08F 110/06 |
| | | | 526/348.3 |
| 2007/0255028 A1 | 11/2007 | Razavi | |
| 2008/0097052 A1* | 4/2008 | Marin | C08F 10/00 |
| | | | 526/170 |
| 2010/0000600 A1 | 1/2010 | Hoya | |
| 2011/0003095 A1 | 1/2011 | Becker | |
| 2011/0003916 A1 | 1/2011 | Becker | |
| 2011/0160502 A1* | 6/2011 | Wu | C07C 2/30 |
| | | | 585/16 |
| 2012/0015854 A1 | 1/2012 | Ravishankar | |
| 2012/0283399 A1 | 11/2012 | Yamamoto | |
| 2014/0213745 A1 | 7/2014 | Jiang | |
| 2017/0022439 A1* | 1/2017 | Kilgore | C10G 50/02 |
| 2017/0058156 A1* | 3/2017 | Tse | C08L 23/12 |
| 2017/0130159 A1* | 5/2017 | Dias | C08F 4/65927 |
| 2017/0198413 A1* | 7/2017 | Lief | B29C 48/05 |
| 2023/0174883 A1* | 6/2023 | Zhang | C10M 143/00 |
| | | | 508/591 |

OTHER PUBLICATIONS

Derosa, Claudio et al., "Mechanical Properties of Syndiotactic Propylene-Ethylene Copolymers", Macromolecules, 2006, pp. 249-256, vol. 39.

* cited by examiner

POLYPROPYLENE VISCOSITY MODIFIERS AND LUBRICATING OILS THEREOF

CROSS REFERENCE TO RELATED APPLICATIONS

This application is a national stage application under 35 USC 371 of International Application No. PCT/US2022/046961 filed on Oct. 18, 2022, which claims priority to and the benefit of U.S. Provisional Application No. 63/275,996, filed Nov. 5, 2021, the disclosure of each of which is incorporated herein by reference in its entirety.

FIELD

The present disclosure relates to syndiotactic polypropylene homopolymers and lubricating oils comprising syndiotactic polypropylene homopolymers.

BACKGROUND

Lubrication fluids are applied between moving surfaces to reduce friction, thereby improving efficiency and reducing wear. Lubrication fluids also often function to dissipate the heat generated by moving surfaces.

One type of lubrication fluid is petroleum-based lubrication oil used for internal combustion engines. Lubrication oils contain additives that help the lubrication oil to have a certain viscosity at a given temperature. In general, the viscosity of lubrication oils and fluids is inversely dependent upon temperature. When the temperature of a lubrication fluid is increased, the viscosity generally decreases, and when the temperature is decreased, the viscosity generally increases. For internal combustion engines, a lubrication oil should have a lower viscosity at low temperatures to facilitate the engine starting during cold weather and should have a higher viscosity at higher ambient temperatures when lubrication properties typically decline.

Additives for lubrication fluids and oils include rheology modifiers, such as viscosity index (VI) improvers. VI improving components, many of which are derived from ethylene-α-olefin polymers, modify the rheological behavior of a lubricant to increase viscosity and promote a more constant viscosity over the range of temperatures at which the lubricant is used.

Higher ethylene content copolymers efficiently promote oil thickening and shear stability. However, higher ethylene content copolymers also tend to aggregate in oil formulations leading to extremely viscous formulations. Aggregation typically happens at ambient or subambient conditions of controlled and quiescent cooling. This deleterious property of otherwise advantageous higher ethylene content viscosity improvers is measured by low temperature solution rheology. Various remedies have been proposed for these higher ethylene content copolymer formulations to overcome or mitigate the propensity towards the formation of high viscosity at low temperature.

Nevertheless, there is a need for improved viscosity index modifiers and lubricating oils comprising such viscosity index modifiers that exhibit good viscometrics, high thickening efficiency, good high temperature high shear performance, and acceptable shear stability index.

References for citing in an information disclosure statement (37 C.F.R. 1.97(h)): WO2010/016847; U.S. Pat. Nos. 9,045,574; 7,589,145; US 2007/0117941; U.S. Pat. No. 5,272,003; WO 2007/002177; US 2004/0127614; US 2006/029424; WO 2000/12594; EP-351391; US 2007/0255028; U.S. Pat. No. 6,143,683; US 2005/0070669; U.S. Pat. No. 5,476,914; US 2003/0096896; SG-178810; CA2514426; US 2006/0057321; US 2010/0000600; EP1900758; US 2012/0283399; US 2011/0003095; US 2011/0003916; US 2003/0060584; PII: S0032-3861 (97) 10174-4 (De Rosa, et al., Polymer (1998) Vol. 39 (25), p. 6219-6226); WO 2016/018523; Macromolecules, 2006, 39, 249-256.

SUMMARY

In some embodiments, a lubricating oil includes at least 50 wt % of a base oil, based on total weight of the lubricating oil. The lubricating oil includes at least 0.1 wt % of a polypropylene homopolymer having a racemic dyad content of about 60% to about 99% and a number average molecular weight (by GPC DRI) of about 10,000 g/mol to about 250,000 g/mol, wherein a total amount of the base oil and the polypropylene homopolymer does not exceed 100 wt %.

In some embodiments, an additive package includes a polypropylene homopolymer having a racemic dyad content of about 50% to about 99% and a number average molecular weight of about 10,000 g/mol to about 250,000 g/mol. The additive package includes one or more additives independently selected from a group consisting of a friction modifier, a pour point depressant, a traction improving additive, a defoamant, a haze inhibitor, a pressure additive, an antioxidant, a solubility additive, a dispersant, a detergent, a corrosion inhibitor, a rust inhibitor, a metal deactivator, an anti-wear agent, an anti-seizure agent, a wax modifier, a viscosity modifier, a fluid-loss additive, a seal compatibility agent, a lubricity agent, an anti-staining agent, a chromophoric agent, a demulsifier, an emulsifier, a densifier, a wetting agent, a gelling agent, a tackiness agent, a colorant, and combination(s) thereof.

These and other features and attributes of viscosity modifiers of the present disclosure and their advantageous applications and/or uses will be apparent from the detailed description which follows.

BRIEF DESCRIPTION OF THE FIGURES

To assist those of ordinary skill in the relevant art in making and using the subject matter hereof, reference is made to the appended figures, wherein.

DETAILED DESCRIPTION

Figure 1:
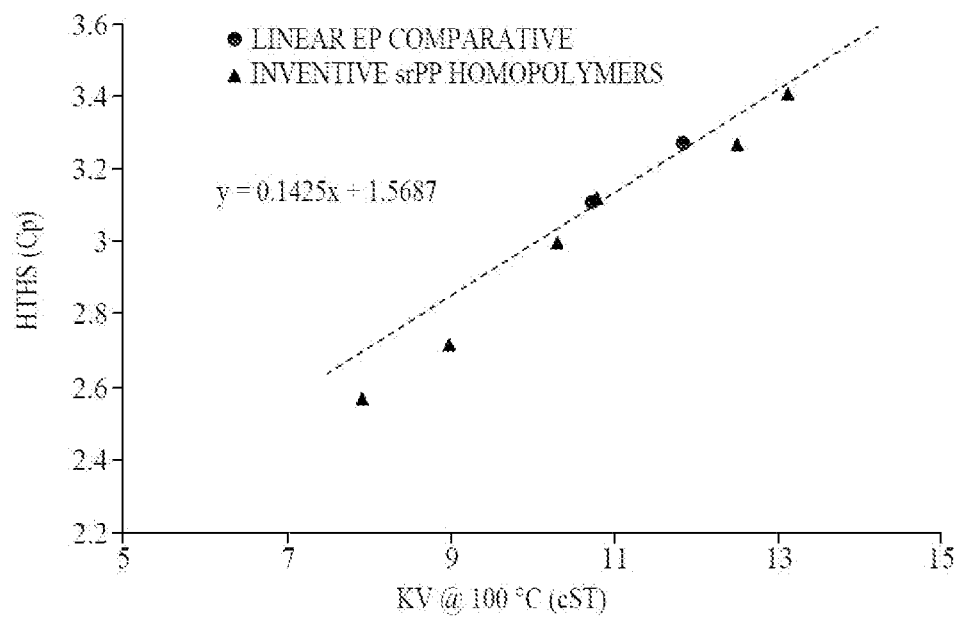
FIG. 1 is a graph illustrating high temperature high shear (HTHS) viscosity obtained at temperature of 150° C. and a shear rate of $10^{-6}$ s$^{-1}$ vs. kinematic viscosity (KV) at 100° C. and a shear rate of 0.01 s$^{-1}$ for commercial copolymers and the syndiorich polypropylene homopolymers, according to an embodiment.

The present disclosure relates to syndiotactic polypropylene homopolymers and lubricating oils comprising syndiotactic polypropylene homopolymers. Syndiotactic polypropylene homopolymers of the present disclosure modify the viscosity characteristics throughout a broad range of engine operating temperatures and shear environments. Syndiotactic polypropylene homopolymers efficiently promote oil thickening and shear stability. Indeed, syndiotactic polypropylene homopolymers provide alternative polymers that can be used as a viscosity index improver for lubricating oils that exhibit good viscometrics, high thickening efficiency, good high temperature high shear performance, and acceptable shear stability index.

In particular, the performance of viscosity index (VI) improvers can be substantially improved, as measured by the thickening efficiency (TE) and the shear stability index (SSI), by appropriate and careful manipulation of the structure of the VI improver. Both the TE and SSI are related to the molecular weight of the polymer. For example, polymers having low molecular weight generally have both lower measured TE and lower SSI than polymers having a high molecular weight. However, the TE and SSI are also determined by the polymer structure and chemistry. For example, typical commercial viscosity modifiers are ethylene-propylene (EP) copolymers with ethylene contents greater than 40 wt %. Such commercial polymers show relatively high viscous drag under high shear high temperature conditions (high HTHS) at given kinematic viscosity (KV). (Lower viscous drag corresponds to lower HTHS at the same kinematic viscosity.) At any given KV, the lower the HTHS, the better the fuel economy. In comparison, lubricating oils of the present disclosure having syndiotactic polypropylene homopolymers provide lower viscous drag which reduces energy loss under normal operating conditions of diesel or gasoline engines. The lower viscous drag provides better fuel economy than a lubricating oil having a higher viscous drag. In addition, the low temperature properties of the lubricant oil with syndiotactic polypropylene homopolymers of the present disclosure are also improved as compared to commercial EP copolymers.

In addition, the syndiotactic polypropylene homopolymers provide lowering HTHS without crystallization or gelation. Crystallization or gelation can be avoided due to an advantageous level of syndiotacticity of polypropylene and advantageous molecular weight of the syndiotactic polypropylene homopolymers. For example, if syndiotacticity is too high or molecular weight is too high, the homopolymer is not soluble in base oil. Even in the absence of comonomer content, lubricating oils of the present disclosure having the syndiotactic polypropylene homopolymers can have an acceptable TE/SSI balance.

As used herein, the numbering scheme for the Periodic Table of the Elements is used as set out in CHEMICAL AND ENGINEERING NEWS, 63(5), 27 (1985).

Unless otherwise stated all pressures in psi are psig and all molecular weights are g/mol.

For purposes of the present disclosure, when a polymer is referred to as comprising an olefin, the olefin present in the polymer is the polymerized form of the olefin, respectively.

For the purposes of this disclosure, the term "polypropylene" as used herein means polymers containing propylene as monomers.

A "catalyst system" is a combination of at least one catalyst compound, at least one activator, an optional coactivator, and an optional support material. The terms "catalyst compound", "catalyst complex", "transition metal complex", "transition metal compound", "precatalyst compound", and "precatalyst complex" are used interchangeably. When "catalyst system" is used to describe such a pair before activation, it means the unactivated catalyst complex (precatalyst) together with an activator and, optionally, a coactivator. When it is used to describe such a pair after activation, it means the activated complex and the activator or other charge-balancing moiety. The transition metal compound may be neutral as in a precatalyst, or a charged species with a counter ion as in an activated catalyst system. For the purposes of the present disclosure and the claims thereto, when catalyst systems are described as including neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein are intended to embrace both neutral and ionic forms of the catalyst compounds and activators.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. A "Lewis base" is a neutrally charged ligand which donates one or more pairs of electrons to a metal ion. Examples of Lewis bases include ethylether, trimethylamine, pyridine, tetrahydrofuran, dimethylsulfide, and triphenylphosphine. The term "heterocyclic Lewis base" refers to Lewis bases that are also heterocycles. Examples of heteroyclic Lewis bases include pyridine, imidazole, thiazole, and furan.

A scavenger is a compound that can be added to facilitate polymerization by scavenging impurities. Some scavengers may also act as activators and may be referred to as coactivators. A coactivator, that is not a scavenger, may also be used in conjunction with an activator in order to form an active catalyst. In at least one embodiment, a coactivator can be pre-mixed with the transition metal compound to form an alkylated transition metal compound.

Noncoordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. A Lewis acid is defined to be a compound or element that can react with an electron donor to form a bond. An NCA coordinates weakly enough that a Lewis base, such as an olefin monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon.

Described herein are syndiotactic propylene homopolymers and lubricating oil compositions comprising the same. Without being bound by theory, it is believed that, the syndiotactic propylene homopolymers described herein are particularly useful as viscosity index improvers due to their syndiotactic structure.

The degree and type of tacticity of a polyolefin polymer is known to affect the physical properties of the polymer. Tacticity can also be related to the degree of crystallization that a polymer or copolymer is capable of obtaining. As used herein, the tacticity of a polymer, reflects the stereochemical regularity of hydrocarbyl groups which are pendent to the polymer backbone (i.e., the tacticity of the polymer). Several types of tacticity are known, including atactic, normal isotactic, isotactic stereoblock, syndiotactic, and hemiisotactic.

The backbone rigidity of a syndiotactic polypropylene (sPP) is greater than that of atactic and isotactic polypropylenes (aPP, iPP) as gauged by its higher characteristic ratio $C\infty$ (sPP: about 9 MPa; aPP or iPP: about 6 MPa). The higher backbone rigidity leads to higher plateau modulus for syndiotactic polypropylene relative to atactic polypropylene and isotactic polypropylene when they have similar molecular weights. Without being bound by theory, it is believed that this attribute affords syndiotactic polymers improved viscometric properties in lubricant applications when such syndiotactic polymers are used as viscosity modifiers. Therefore, without being bound by any theory, it is believed that, compared with non-syndiotactic propylene-α-olefin copolymers or non-syndiotactic polypropylene homopolymers, the syndiotactic polypropylene homopolymers provided herein have improved viscometric properties and can provide better thickening efficiency in lubricating applications when used as viscosity index improvers.

Syndiotactic Polymers

Syndiotactic polymers are those where the hydrocarbyl groups pendent to the polymer backbone alternate sequentially in order from one side or plane to the opposite side or plane relative to the polymer backbone, as shown below:

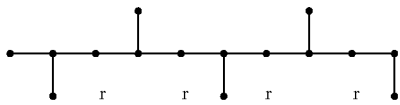

In NMR nomenclature, the pentad shown above is described as "rrrr" in which each r represents a "racemic" dyad, i.e., successive methyl groups on alternate sides of the plane (see J. A. Ewen's chapter in "Catalytic Polymerization of Olefins", Proceedings of the International Symposium on Future Aspects of Olefin Polymerization, Tokyo, Japan, 4-6 Jul. 1995", Keii & Soga, Eds., Elsevier Science Publishers B.V., Amsterdam, 1986, p. 271 (the Ewen method)). The percentage of r dyads in the chain determines the degree of syndiotacticity of the polymer, and is related to the crystallization of the polymer.

The molecular chain backbone of a syndiotactic polymer can be considered to be a polymer of olefins with alternating stereochemical configurations. Highly syndiotactic polymers may be highly crystalline and thus may have defined melting points similar to their isotactic polymorphs and thus may be characterized in part by their melting point temperature.

Tacticity (% [r] dyads, % [m] dyads, and the like) is determined using $^{13}C$ NMR according to the method described at pages 271 to 292 of "Catalytic Polymerization of Olefins, Proceedings of the International Symposium on Future Aspects of Olefin Polymerization, Tokyo, Japan, 4-6 Jul. 1995", Keii & Soga, Eds., Elsevier Science Publishers B.V., Amsterdam, 1986.

Polymerization

Described herein are processes for making syndiotactic polypropylene homopolymers. A process employs transition metal catalysts together with one or more activators (such as a non-coordinating anion), such as in the presence of a chain transfer agent (such as an alkylaluminum compound and/or hydrogen). Some transition metal catalysts contain $C_s$-symmetric active sites, which favors the formation of polypropylene homopolymers with syndiotactic stereo arrangement of the propylene monomers.

A process for producing the syndiotactic polypropylene homopolymer includes contacting propylene with a catalyst and an activator, such as a non-coordinating anion activator. The catalyst may have a structure such as that represented by any of formulae (1), (1a), (1b), (2), (3), or (3a), described below, having $C_s$ or pseudo-$C_s$ symmetry, or a structure as represented by formula (4), described below, having $C_2$ symmetry. The polymerization may occur in the presence of a chain transfer agent, such as an alkylaluminum compound.

The polymerization may take place at a reaction temperature of about −20° C. to about 160° C., or about 0° C. to about 120° C., or about 10° C. to about 100° C., or about 60° C. to about 100° C. For most catalyst systems, the syndiotacticity of propylene homopolymer decreases with increasing polymerization temperature. The desired reaction temperature can be optimized according to the level of syndiotacticity required for a specific application. The polymerization may take place at reaction pressure of about 10 psig to about 2000 psig, or about 50 to about 1600 psig, or about 100 psig to about 500 psig.

In some embodiments, the hydrogen may be present in the reactor at about 1000 ppm or less, or about 750 ppm or less, or about 500 ppm or less, or about 250 ppm or less, or about 100 ppm or less, or about 50 ppm or less, or about 25 ppm or less, or about 10 ppm or less, or about 5 ppm or less. Alternatively, hydrogen, if present, is present in the feed at about 1000 ppm or less, or about 750 ppm or less, or about 500 ppm or less, or about 250 ppm or less, or about 100 ppm or less, or about 50 ppm or less, or about 25 ppm or less, or about 10 ppm or less, or about 5 ppm or less by weight of the feed.

Many polymerization processes and reactor types used for metallocene-catalyzed polymerizations such as solution, slurry, and bulk polymerization processes can be used in this disclosure. In some embodiments, if a solid or supported catalyst is used, a slurry or continuous fixed bed or plug flow process is suitable. In some embodiments, the monomers are contacted with the metallocene compound and the activator in the solution phase, bulk phase, or slurry phase, such as in a continuous stirred tank reactor, continuous tubular reactor, or a batch reactor. The monomer(s), metallocene, and activator are contacted for a residence time of about 1 second to about 100 hours, or about 30 seconds to about 50 hours, or about 2 minutes to about 6 hours, or about 1 minute to about 4 hours, where desirable ranges may include ranges from any lower limit to any upper limit. In another embodiment, solvent or diluent is present in the reactor and is selected from the group consisting of butanes, pentanes, hexanes, heptanes, octanes, nonanes, decanes, undecanes, dodecanes, tridecanes, tetradecanes, pentadecanes, hexadecanes, toluene, o-xylene, m-xylene, p-xylene, ethylbenzene, isopropylbenzene, and n-butylbenzene; such as toluene and or xylenes and or ethylbenzene, normal paraffins (such as Norpar solvents available for ExxonMobil Chemical Company, Houston, TX.), or isoparaffin solvents (such as Isopar solvents available for ExxonMobil Chemical Company, Houston, Tex.). These solvents or diluents are usually pretreated in same manners as the feed olefins.

One or more reactors in series or in parallel may be used in the polymerization process. The transition metal compound, activator, and chain transfer agent, if used, may be delivered as a solution or slurry/suspension in a solvent or in the α-olefin feed stream, either separately to the reactor, activated in-line just prior to the reactor, or premixed as an activated solution or slurry to the reactor. Polymerizations can be carried out in either single reactor operation, in which propylene, catalyst/activator, and chain transfer agent are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In at least one embodiment, the precatalyst is activated in the reactor in the presence of olefin. In some embodiments, the precatalyst such as the dichloride form of the metallocenes is pre-treated with alkylaluminum reagents, especially, triisobutylaluminum, tri-n-hexylaluminum and/or tri-n-octylaluminum, followed by charging into the reactor containing other catalyst component and the feed olefins, or followed by pre-activation with the other catalyst component to give the fully activated catalyst, which is then fed into the reactor containing feed olefins. In another alternative, the pre-catalyst is mixed with the activator and/or the co-activator and this activated catalyst is then charged into reactor, together with feed olefin stream containing some scavenger or co-activator. In another alternative, the whole or part of the co-activator is pre-mixed with the feed olefins and charged into the reactor at the same time as the other catalyst solution containing catalysts and activators and/or co-activator.

In some embodiments, the complete catalyst system can additionally comprise one or more scavenging compounds. Here, the term scavenging compound means a compound that removes impurities from the reaction environment. These impurities adversely affect catalyst activity and stability. Typically, purifying processes are usually used before introducing reaction components to a reaction vessel.

The syndiotactic polypropylene hompolymers described herein can also be produced in homogeneous solution processes. Generally, homogeneous solution processes involve polymerization in a continuous reactor in which the polymer formed and the starting monomer and catalyst materials supplied, are agitated to reduce or avoid concentration and/or temperature gradients. Temperature control in the reactor is generally obtained by balancing the heat of polymerization and with reactor cooling by reactor jackets or cooling coils or a cooled side-stream of reactant to cool the contents of the reactor, auto refrigeration, pre-chilled feeds, vaporization of liquid medium (diluent, monomers or solvent) or combinations of the above. Adiabatic reactors with pre-chilled feeds may also be used. The reactor temperature depends on the catalyst used and the product desired. Higher temperatures typically yield polymers having lower molecular weights and lower temperatures typically yield polymers having higher molecular weights. In order to produce polymers with narrow molecular distribution, such as to promote the highest possible shear stability, it is useful to control the reaction temperature to obtain minimum of temperature fluctuation in the reactor or over the course of the reaction time. If multiple reactors are used in series or in parallel, it is useful to keep the temperature constant in a pre-determined value to minimize any broadening of molecular weight distribution. In order to produce polymer having broad molecular weight distribution, one can adjust the reaction temperature swing or fluctuation, or as in series operation, the second reactor temperature can be higher than the first reactor temperature. In parallel reactor operation, the temperatures of the two reactors are independent. One can also use two types of catalyst.

The reaction time or reactor residence time is usually dependent on the type of catalyst used, the amount of catalyst used, and the desired conversion level. Catalysts such as diphenylmethylidene(cyclopentadienyl)(9-fluorenyl)zirconium dimethyl, isopropylidene-(cyclopentadienyl)(9-fluorenyl)zirconium dimethyl, isopropylidene-(cyclopentadienyl)(9-fluorenyl)zirconium dichloride, diphenylsilylene(cyclopentadienyl)(9-fluorenyl)zirconium dimethyl, dimethylsilylene(cyclopentadienyl)(9-fluorenyl)zirconium dimethyl, ethylene(cyclopentadienyl)(9-fluorenyl)zirconium dimethyl, di(para-triethylsilylphenyl)methylene(2,7-di-tertbutylfluorenyl)(cyclopentadienyl) hafnium dimethyl, and di(para-triethylsilylphenyl)methylene(2,7-di-tertbutylfluorenyl)(cyclopentadienyl) zirconium dimethyl, and mixtures thereof are particularly useful herein.

In some embodiments, the mole ratio of non-coordinating anion activator to catalyst can be about 10 to about 0.1, or about 5 to about 0.5, or about 3 to about 0.5, or about 5 to about 0.2, or about 2 to about 0.5, or about 1.5 to about 0.7, or about 1.2 to about 0.8 or about 1.1 to about 0.9.

When a solid supported catalyst is used, a slurry polymerization process generally operates in the similar temperature, pressure and residence time range as described previously. In a slurry polymerization, a suspension of solid catalyst, promoters, and monomer are added. The suspension including diluent is intermittently or continuously removed from the reactor. The propylene homopolymer is then separated to remove solvent, any unreacted components. A portion or all of the solvent and unreacted component can be recycled for reuse.

In a typical solution process, catalyst components, solvent, monomers and hydrogen (when used) are fed under pressure to one or more reactors. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The monomers are dissolved/dispersed in the solvent either prior to being fed to the first reactor or dissolve in the reaction mixture. The solvent and monomers are generally purified to remove potential catalyst poisons prior entering the reactor. The feedstock may be heated or cooled prior to feeding to the first reactor. Additional monomers and solvent may be added to the second reactor, and it may be heated or cooled. The catalysts/activators can be fed in the first reactor or split between two reactors. In solution polymerization, polymer produced is remains dissolved in the solvent under reactor conditions, forming a polymer solution (also referred as to effluent).

The solution polymerization process of this invention uses stirred tank reactor system comprising one or more stirred polymerization reactors. Generally the reactors should be operated under conditions to achieve a thorough mixing of the reactants. In a multiple reactor system, the first polymerization reactor preferably operates at lower temperature. The residence time in each reactor will depend on the design and the capacity of the reactor. The catalysts/activators can be fed into the first reactor only or split between two reactors. In an alternative embodiment, a loop reactor and plug flow reactors can be employed for current invention.

The polymer solution is then discharged from the reactor as an effluent stream and the polymerization reaction is quenched, typically with coordinating polar compounds, to prevent further polymerization. On leaving the reactor system the polymer solution is passed through a heat exchanger system on route to a devolatilization system and polymer finishing process. The lean phase and volatiles removed downstream of the liquid phase separation can be recycled to be part of the polymerization feed.

A polymer can be recovered from the effluent of either reactor or the combined effluent, by separating the polymer from other constituents of the effluent. Conventional separation means may be employed. For example, polymer can be recovered from effluent by coagulation with a non-solvent such as isopropyl alcohol, acetone, or n-butyl alcohol, or the polymer can be recovered by heat and vacuum stripping the solvent or other media with heat or steam. One or more conventional additives such as antioxidants can be incorporated in the polymer during the recovery procedure. Other methods of recovery such as by the use of lower critical solution temperature (LCST) followed by devolatilization are also envisioned.

Catalyst Compounds

The catalyst compounds described herein are used to polymerize propylene. As used herein, the terms "hydrocarbyl radical," "hydrocarbyl," and "hydrocarbyl group" are used interchangeably throughout the present disclosure. Likewise the terms "group," "radical," and "substituent" are also used interchangeably throughout the present disclosure. For purposes of this disclosure, "hydrocarbyl radical" is defined to be a C1-C100 radical and may be linear, branched, or cyclic. When cyclic, the hydrocarbyl radical may be aromatic or non-aromatic. "Hydrocarbyl radical" is defined to include substituted hydrocarbyl radicals, halocarbyl radicals, substituted halocarbyl radicals, silylcarbyl radicals, and germylcarbyl radicals as these terms are defined below. Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g., $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Hydrocarbylsilyl groups, also referred to as silylcarbyl groups (also referred to as hydrocarbyl silyl groups), are radicals in which one or more hydrocarbyl hydrogen atoms have been substituted with at least one $SiR^*_3$ containing group or where at least one —Si(R*)$_2$— has been inserted within the hydrocarbyl radical where R* is independently a hydrogen, a hydrocarbyl or halocarbyl radical, and two or more R* may join together to form a substituted or unsubstituted saturated, partially unsaturated or aromatic cyclic or polycyclic ring structure. Silylcarbyl radicals can be bonded via a silicon atom or a carbon atom.

Substituted silylcarbyl radicals are silylcarbyl radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $GeR^*_3$, $SnR^*_3$, $PbR^*_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrogen, a hydrocarbyl or halocarbyl radical, and two or more R* may join together to form a substituted or unsubstituted saturated, partially unsaturated or aromatic cyclic or polycyclic ring structure.

Germylcarbyl radicals, also referred to as germylcarbyl groups (also referred to as hydrocarbyl germyl groups), are radicals in which one or more hydrocarbyl hydrogen atoms have been substituted with at least one $GeR^*_3$ containing group or where at least one —Ge(R*)$_2$— has been inserted within the hydrocarbyl radical where R* is independently a hydrogen, a hydrocarbyl or halocarbyl radical, and two or more R* may join together to form a substituted or unsubstituted saturated, partially unsaturated or aromatic cyclic or polycyclic ring structure. Germylcarbyl radicals can be bonded via a germanium atom or a carbon atom.

Substituted germylcarbyl radicals are germylcarbyl radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $GeR^*_3$, $SnR^*_3$, $PbR^*_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrogen, a hydrocarbyl or halocarbyl radical, and two or more R* may join together to form a substituted or unsubstituted saturated, partially unsaturated or aromatic cyclic or polycyclic ring structure.

"Polar radicals" (or "polar groups") are groups in which a heteroatom functionality is bonded directly to the indicated atom or atoms. Polar radicals include heteroatoms of groups 1-17 of the Periodic Table (except carbon and hydrogen) either alone or connected to other elements by covalent bonds or other interactions such as ionic bonds, van der Waals forces, or hydrogen bonding. Examples of functional heteroatom containing groups include carboxylic acids, acid halides, carboxylic esters, carboxylic salts, carboxylic anhydrides, aldehydes and their chalcogen (group 14) analogues, alcohols and phenols, ethers, peroxides and hydroperoxides, carboxylic amides, hydrazides and imides, amidines and other nitrogen analogues of amides, nitriles, amines and imines, azos, nitros, other nitrogen compounds, sulfur acids, selenium acids, thiols, sulfides, sulfoxides, sulfones, phosphines, phosphates, other phosphorus compounds, silanes, boranes, borates, alanes, aluminates. Examples of polar groups include $NR^*_2$, $OR^*$, $SeR^*$, $TER^*$, $PR^*_2$, $AsR^*_2$, $SbR^*_2$, $SR^*$, $BR^*_2$, $SnR^*_3$, $PbR^*_3$ and the like where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure.

In using the terms "substituted or unsubstituted cyclopentadienyl ligand", "substituted or unsubstituted indenyl ligand", and "substituted or unsubstituted tetrahydroindenyl ligand", the substitution to the aforementioned ligand may be hydrocarbyl, substituted hydrocarbyl, halocarbyl, substituted halocarbyl, silylcarbyl, or germylcarbyl. The substitution may also be within the ring giving heterocyclopentadienyl ligands, heteroindenyl ligands or heterotetrahydoindenyl ligands, each of which can additionally be substituted or unsubstituted.

The hydrocarbyl radical may be independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, cicosyl, hencicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, cicosenyl, hencicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, cicosynyl, hencicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Examples of cyclopentadienyl and indenyl ligands are illustrated below as anionic ligands. The ring numbering scheme is also illustrated. When a cyclopentadienyl ligand has one bridging substituent, the bridging substituent is in the one position. When a cyclopentadienyl ligand has two bridging substituents, the bridging substituents are in the one and two positions. When a fluorenyl ligand has a bridging substituent, the bridging substituent is in the nine position. When dibenzo[b,h]fluorene has a bridging substituent, the bridging substituent is in the twelve position.

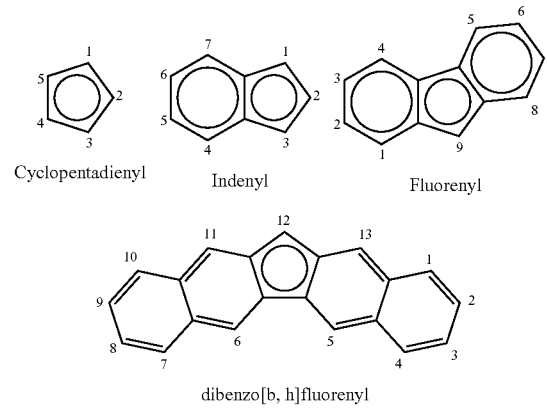

A similar numbering and nomenclature scheme is used for heterocyclopentapentalenyls, heterofluorenyls, and the like, as illustrated below. Each structure illustrated is drawn as an anion.

Non-limiting examples of heterocyclopentapentalenyls include the following, where Q represents the heteroatoms O, S, Se, or Te, or heteroatom groups, NR, PR, AsR, or SbR where R** is hydrogen, or a hydrocarbyl, substituted hydrocarbyl, halocarbyl, substituted halocarbyl, silylcarbyl, or germylcarbyl substituent. When a heterocyclopentapentalenyl ligand has a bridging substituent, the bridging substituent is in the seven position.

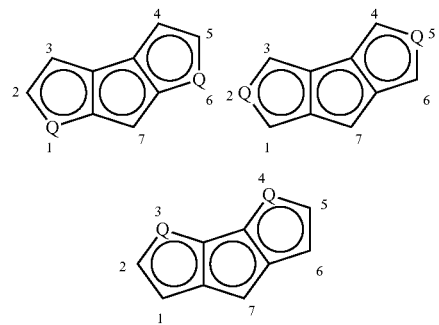

Non-limiting examples of heterofluorenyls where Z represents the heteroatoms N or P include the following. When a heterofluorenyl ligand has a bridging substituent, the bridging substituent is in the nine position.

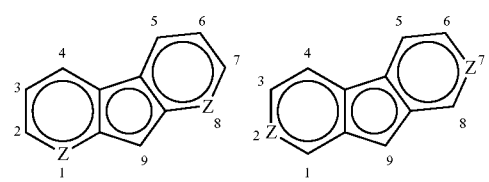

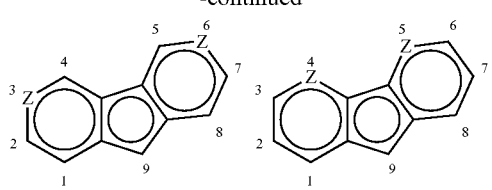

A "ring heteroatom" is a heteroatom that is within a cyclic ring structure. A "heteroatom substituent" is a heteroatom containing group that is directly bonded to a ring structure through the heteroatom. A "bridging heteroatom substituent" is a heteroatom or heteroatom group that is directly bonded to two different ring structures through the heteroatom. The terms "ring heteroatom", "heteroatom substituent", and "bridging heteroatom substituent" are illustrated below where Z and R' are as defined above.

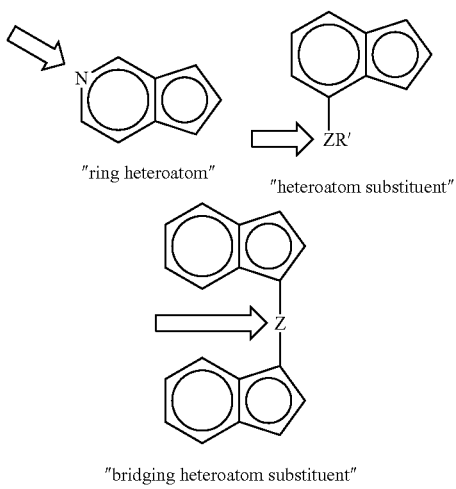

A "ring carbon atom" is a carbon atom that is part of a cyclic ring structure. For example, an indenyl ligand has nine ring carbon atoms; a cyclopentadienyl ligand has five ring carbon atoms.

Transition metal compounds have symmetry elements and belong to symmetry groups. These elements and groups are well established and can be referenced from Chemical Applications of Group Theory (2nd Edition) by F. Albert Cotton, Wiley-Interscience, 1971. Compounds with $C_s$ symmetry possess a mirror plane. For example, the structure below has a $C_s$ symmetric plane that bisects the zirconium center, the carbon bridge and the cyclopentadienyl and fluorenyl ligands.

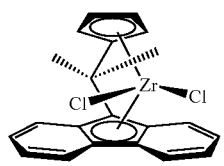

Symmetric substituents are substituents that retain the $C_s$ symmetry of the transition. For example, t-butyl groups substituted in the 2 and 7 positions of a fluorenyl ligand would be symmetric substituents.

Compounds with pseudo-$C_s$ symmetry are similar with the exception that the bridging group, the labile ligands, and distant substituents of similar size on the cyclopentadienyl ligand or fluorenyl ligand are not included in determining the symmetry of the compound. These compounds, while not truly $C_s$-symmetric, are considered to have $C_s$-symmetric active sites for olefin polymerization. Therefore, a compound, for example having a MeEtSi or MePhSi bridging ligand, is considered to have a pseudo $C_s$-plane of symmetry given the appropriate remaining ligand structure. Likewise, a compound, for example having one Me and one Cl labile ligand, is considered to have a pseudo $C_s$-plane of symmetry given the appropriate remaining ligand structure. Non-limiting examples of pseudo $C_s$ symmetric compounds are illustrated below:

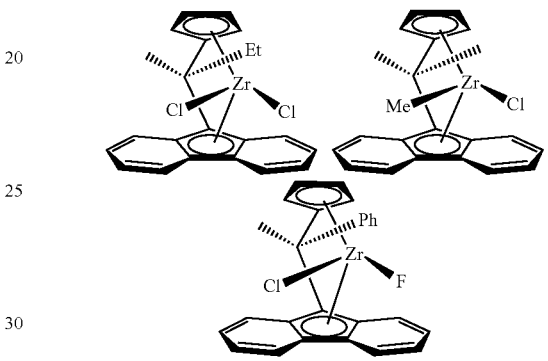

Compounds with pseudo-$C_s$ symmetry can also have unlike substituents on the non-labile ligands (i.e., cyclopentadienyl or fluorenyl ligands) if the substituents are distant from the active site. Substituents of this type, referred to as pseudo symmetric substituents, are typically adjacent to the bridging group and do not substantially differ in size from one another. Typically the size difference of these substituents is within 2 non-hydrogen atoms of each other. Thus, a cyclopentadienyl substituted at the 2 and the 5 positions with methyl and ethyl, respectively, or a cyclopentadienyl substituted at the 2 position with methyl and not substituted in the 5 position, or a fluorenyl substituted at the 1 and the 8 positions with hexyl and octyl, respectively, would be considered to have pseudo-$C_s$ symmetry.

In general, those catalysts both capable of producing syndiotactic polypropylene and capable of reacting with hydrogen to terminate the growing polymer chain, are catalysts that are useful for producing the syndiotactic polypropylene homopolymers herein.

Catalysts useful for making the syndiotactic polypropylene homopolymers include metallocene compounds (precatalysts) having the structure represented by formula (1) having $C_s$ or pseudo-$C_s$ symmetry:

(1)

wherein:
M is zirconium or hafnium;
L¹ is a unsubstituted fluorenyl, heterocyclopentapentaenyl, or heterofluorenyl, or a substituted fluorenyl, heterocyclopentapentalenyl, or heterofluorenyl ligand with one or more symmetric or pseudo symmetric substituents, each substituent group being, independently, a radical group which is a hydrocarbyl, substituted hydrocarbyl, halocarbyl, substituted halocarbyl, silylcarbyl or germylcarbyl, and optionally two or more adjacent substituents may join to form a substituted or unsubstituted, saturated, partially unsaturated or aromatic, cyclic or polycyclic substituent;

$L^2$ is a cyclopentadienyl ring or a substituted cyclopentadienyl ring with one or more symmetric or pseudo symmetric substituents in the 2 and 5 positions of the ring, each substituent group being, independently, a radical group which is a hydrocarbyl, substituted hydrocarbyl, halocarbyl, substituted halocarbyl, silylcarbyl or germylcarbyl;

G is a bridging group;

each X is, independently, a hydride radical, hydrocarbyl, substituted hydrocarbyl, halocarbyl, substituted halocarbyl, silylcarbyl or germylcarbyl; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a dianionic chelating ligand.

In some embodiments of formula (1), $L^1$ is fluorenyl or substituted fluorenyl; such as fluorenyl, 2,7-dimethylfluorenyl, 2,7-diethylfluorenyl, 2,7-dipropylfluorenyl, 2,7-dibutylfluorenyl, 2,7-diphenylfluorenyl, 2,7-dichlorofluorenyl, 2,7-dibromofluorenyl, 3,6-dimethylfluorenyl, 3,6-diethylfluorenyl, 3,6-dipropylfluorenyl, 3,6-dibutylfluorenyl, 3,6-diphenylfluorenyl, 3,6-dichlorofluorenyl, 3,6-dibromofluorenyl, 2,7-di-tertbutyl fluorenyl, or 1,1,4,4,7,7,10,10-octamethyl-octahydrodibenzofluorenyl, most preferably 2,7-di-tert-butylfluorenyl or fluorenyl. In some embodiments, $L^2$ is cyclopentadienyl. In some embodiments, G is methylene, dimethylmethylene, diphenylmethylene, dimethylsilylene, diphenylsilylene, di(4-triethylsilylphenyl)silylene, ethylene, or di(para-triethylsilylphenyl)methylene, most preferably dimethylmethylene, diphenylmethylene or di(para-triethylsilylphenyl)methylene. In some embodiments, each X is, independently, hydrocarbyl or halo, such as methyl, benzyl, fluoro or chloro. In some embodiments, M is zirconium. In alternative embodiments, M is hafnium.

A subset of the metallocene compounds (pre-catalysts) represented by formula (1) having $C_s$ or pseudo-$C_s$ symmetry that may be used are represented by formula (1a):

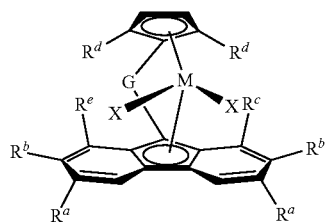

(1a)

wherein M, G and X are defined as in formula (1);

each $R^a$ and $R^b$ is, independently, selected from hydrogen, halogen, hydrocarbyl, substituted hydrocarbyl, halocarbyl, substituted halocarbyl, silylcarbyl, germylcarbyl or polar radicals, and optionally two or more adjacent substituents may join to form a substituted or unsubstituted, saturated, partially unsaturated or aromatic, cyclic or polycyclic substituent, with the proviso that each $R^a$ is the same and each $R^b$ is the same allowing the compound to be $C_s$-symmetric or pseudo $C_s$-symmetric; each $R^c$ is, independently, a symmetric or pseudo symmetric substituent with respect to the other and is selected from hydrogen or a hydrocarbyl, substituted hydrocarbyl, halocarbyl, substituted halocarbyl, silylcarbyl or germylcarbyl radicals;

each $R^d$ is a symmetric or pseudo symmetric substituent with respect to the other and is, independently, selected from hydrogen or a hydrocarbyl, substituted hydrocarbyl, halocarbyl, substituted halocarbyl, silylcarbyl or germylcarbyl radicals.

In some embodiments of formula (1a), each $R^d$, $R^a$ and $R^c$ are hydrogen, and each $R^b$ is a hydrogen, hydrocarbyl, halogen, silylcarbyl, or polar radical; such as hydrogen, methyl, ethyl, propyl, butyl, phenyl, mesityl, fluoro, chloro, bromo, dimethylamido, diethylamido or methoxy; such as hydrogen or butyl; such as hydrogen or tert-butyl; such as hydrogen.

In other embodiments of formula (1a), each $R^d$, $R^b$ and $R^c$ is hydrogen, and each $R^a$ is, independently, a hydrogen, hydrocarbyl, halogen, or silylcarbyl; such as hydrogen, methyl, ethyl, propyl, butyl, fluoro, chloro, or bromo; such as hydrogen or butyl; such as hydrogen or tert-butyl; such as hydrogen.

Still, in other embodiments of formula (1a), each $R^d$ and $R^c$ is hydrogen, and each $R^a$ and $R^b$ are joined together to form a fused partially saturated six-membered carbon ring, each such fused ring may be substituted with four methyl substituents. Such ligand structure is illustrated in formula (1b):

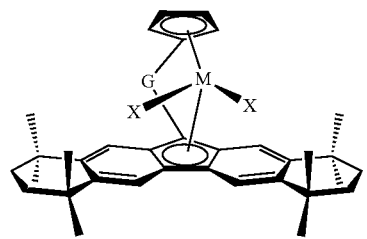

(1b)

Still in other embodiments of formula (1a) $R^c$ and $R^d$ are hydrogen; each $R^a$ and $R^b$ are independently hydrogen, bromine, chlorine, methyl, ethyl, propyl, butyl or phenyl, such as $R^a$ is hydrogen and $R^b$ is hydrogen, methyl, ethyl, propyl, or butyl, or $R^b$ is hydrogen and $R^a$ is hydrogen, methyl, ethyl, propyl, or butyl. In some embodiments, $R^a$ is hydrogen and $R^b$ is tert-butyl or hydrogen. G can be methylene, dimethylmethylene, diphenylmethylene, dimethylsilylene, diphenylsilylene, di(4-triethylsilylphenyl)silylene, ethylene, such as diphenylmethylene, diphenylsilylene, and dimethylsilylene; such as diphenylmethylene. Each X is independently hydrocarbyl or halo, such as methyl, benzyl, fluoro or chloro, such as methyl or chloro. In some embodiments, M is zirconium. In other embodiments, M is hafnium.

In some preferred embodiments of the invention, for the metallocene compounds of formual (1), (1a) and/or (1b), M is zirconium.

Examples of pre-catalysts represented by formula (1) may include: diphenylmethylene(cyclopentadienyl)(9-fluorenyl)

zirconium dichloride, methylene-(cyclopentadicnyl)(9-fluorenyl)zirconium dichloride, dimethylmethylene(cyclopentadicnyl) (9-fluorenyl)zirconium dichloride, dimethylsilylene(cyclopentadienyl)(9-fluorenyl)zirconium dichloride, diphenylsilylene(cyclopentadienyl)(9-fluorenyl) zirconium dichloride, ethylene-(cyclopentadienyl)(9-fluorenyl)zirconium dichloride, diphenylmethylene(cyclopentadienyl) (9-fluorenyl)zirconium dimethyl, methylene (cyclopentadienyl)(9-fluorenyl)zirconium dimethyl, dimethylmethylene(cyclopentadienyl)(9-fluorenyl)zirconium dimethyl, dimethyl-silylene(cyclopentadienyl)(9-fluorenyl)zirconium dimethyl, diphenylsilylene-(cyclopentadicnyl)(9-fluorenyl)zirconium dimethyl, ethylene (cyclopentadienyl)(9-fluorenyl)zirconium dimethyl, di(para-triethylsilylphenyl)methylene(2,7-di-tertbutyl fluorenyl)(cyclopentadicnyl)zirconium dimethyl, diphenylmethylene(cyclopentadienyl)(9-fluorenyl)hafnium dichloride, methylene-(cyclopentadienyl)(9-fluorenyl)hafnium dichloride, dimethylmethylene(cyclopentadienyl) (9-fluorenyl) hafnium dichloride, dimethylsilylene(cyclopentadienyl)(9-fluorenyl)hafnium dichloride, diphenylsilylene (cyclopentadienyl)(9-fluorenyl)hafnium dichloride, ethylene-(cyclopentadienyl)(9-fluorenyl)hafnium dichloride, diphenylmethylene(cyclopentadienyl)(9-fluorenyl)hafnium dimethyl, methylene(cyclopentadienyl)(9-fluorenyl) hafnium dimethyl, dimethylmethylene(cyclopentadienyl)(9-fluorenyl)hafnium dimethyl, dimethyl-silylene (cyclopentadienyl)(9-fluorenyl)hafnium dimethyl, diphenylsilylene-(cyclopentadicnyl)(9-fluorenyl)hafnium dimethyl, ethylene(cyclopentadienyl)(9-fluorenyl)hafnium dimethyl, and di(para-triethylsilylphenyl)methylene(2,7-di-tertbutyl fluorenyl)(cyclopentadicnyl)hafnium dimethyl. In some embodiments, pre-catalysts represented by formula (1) can be dimethyl, diphenylmethylene(cyclopentadicnyl)(9-fluorenyl)hafnium dimethyl, diphenylmethylene(cyclopentadienyl)(9-fluorenyl)hafnium dimethyl, di(para-triethylsilylphenyl)methylene(2,7-di-tertbutylfluorenyl) (cyclopentadicnyl)hafnium dimethyl, diphenylmethylene (cyclopentadienyl)(9-fluorenyl)zirconium dimethyl, diphenylmethylene(cyclopentadienyl)(9-fluorenyl)zirconium dimethyl, or di(para-triethylsilylphenyl)methylene(2,7-di-tertbutylfluorenyl)(cyclopentadienyl)zirconium dimethyl. In some embodiments, zirconium based catalsyts of formula 1, 1a and 1b are preferred such as, for example diphenylmethylene(cyclopentadienyl)(9-fluorenyl)zirconium dimethyl, or di(para-triethylsilylphenyl)methylene(2,7-di-tertbutylfluorenyl)(cyclopentadienyl)zirconium dimethyl Catalysts capable of making the syndiotactic polypropylene homopolymers can also include metallocene compounds (pre-catalysts) having the structure represented by formula (2) having $C_s$ or pseudo-$C_s$ symmetry:

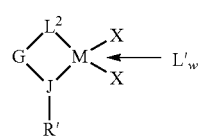

(2)

wherein:

M is hafnium, zirconium or titanium;

$L^1$ is a unsubstituted fluorenyl, heterocyclopentapentalenyl, or heterofluorenyl, or a substituted fluorenyl, heterocyclopentapentalenyl, or heterofluorenyl ligand with one or more symmetric or pseudo symmetric substituents, each substituent group being, independently, a radical group which is a hydrocarbyl, substituted hydrocarbyl, halocarbyl, substituted halocarbyl, silylcarbyl or germylcarbyl, and optionally two or more adjacent substituents may join to form a substituted or unsubstituted, saturated, partially unsaturated or aromatic, cyclic or polycyclic substituent;

G is a bridging group;

J is a heteroatom from group 15, such as N or P, such as N;

R' is a radical group which is a hydrocarbyl, substituted hydrocarbyl, halocarbyl, or substituted halocarbyl;

L' is a neutral Lewis base and w represents the number of L' bonded to M where w is 0, 1, or 2, and optionally any L' and any X may be bonded to one another;

each X is independently hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a dianionic chelating ligand.

In some embodiments of formula (2), L' is fluorenyl or substituted fluorenyl, such as fluorenyl, 2,7-dimethylfluorenyl, 2,7-diethylfluorenyl, 2,7-dipropylfluorenyl, 2,7-dibutylfluorenyl, 2,7-diphenylfluorenyl, 2,7-dichlorofluorenyl, 2,7-dibromofluorenyl, 3,6-dimethylfluorenyl, 3,6-diethylfluorenyl, 3,6-dipropylfluorenyl, 3,6-dibutylfluorenyl, 3,6-diphenylfluorenyl, 3,6-dichlorofluorenyl, 3,6-dibromofluorenyl or 1,1,4,4,7,7,10,10-octamethyl-octahydrodibenzofluorenyl. In some embodiments, G is methylene, dimethylmethylene, diphenylmethylene, dimethylsilylene, methylphenylsilylene, diphenylsilylene, di(4-triethylsilylphenyl)silylene, ethylene, such as diphenylmethylene, diphenylsilylene, methylphenylsilylene, and dimethylsilylene; such as dimethylsilylene. In some embodiments, J is nitrogen. In some embodiments, R' is hydrocarbyl or halocarbyl, such as $C_3$-$C_{20}$ hydrocarbyl, such as all isomers (including cyclics and polycyclics) of propyl, butyl, pentyl, hexyl, heptyl, octyl, nonyl, decyl, undecyl, dodecyl, benzyl, phenyl and substituted phenyl, such as tert-butyl, neopentyl, benzyl, phenyl, diisopropylphenyl, adamantyl, norbornyl, cyclohexyl, cyclooctyl, cyclodecyl, and cyclododecyl, such as tert-butyl, adamant-1-yl, norborn-2-yl, cyclohexyl, cyclooctyl, and cyclododecyl. In some embodiments, X is hydrocarbyl or halo, such as methyl, benzyl, floro or chloro, such as methyl or chloro. In some embodiments, w is zero (L' being absent) and M is zirconium or titanium.

In some embodiments, a catalyst of Formula (2) is:

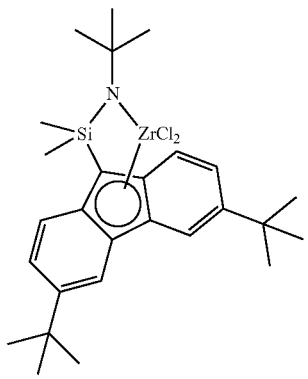

Catalysts useful for making the syndiotactic polypropylene homopolymers can also include metallocene compounds (pre-catalysts) having a structure represented by formula (3) having $C_s$ or pseudo-$C_s$ symmetry:

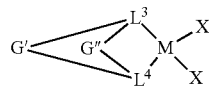
(3)

wherein:
M is hafnium or zirconium;
$L^3$ is a cyclopentadienyl ring optionally substituted in the 4 position of the ring, the substituent group being chosen from a radical group which is a hydrocarbyl, substituted hydrocarbyl, halocarbyl, substituted halocarbyl, silylcarbyl or germylcarbyl;
$L^4$ is a substituted cyclopentadienyl ring with symmetric or pseudo symmetric substituents in the 3 and 5 positions of the ring, each substituent group being, independently, a radical group which is a hydrocarbyl, substituted hydrocarbyl, halocarbyl, substituted halocarbyl, silylcarbyl or germylcarbyl;
G' and G" are bridging groups;
each X is independently a hydride radical, hydrocarbyl, substituted hydrocarbyl, halocarbyl, substituted halocarbyl, silylcarbyl or germylcarbyl; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a dianionic chelating ligand.

In formula (3), $L^3$ is cyclopentadienyl, or hydrocarbyl or silylcarbyl substituted cyclopentadienyl with the substitution on the 4-position of the cyclopentadienyl ring, such as cyclopentadienyl, 4-methylcyclopentadienyl, 4-ethylcyclopentadienyl, 4-propylcyclopentadienyl, 4-butylcyclopentadienyl, 4-pentylcyclopentadienyl, 4-hexylcyclopentadienyl, 4-heptylcyclopentadienyl, 3-octylcyclopentadienyl, or 4-trimethylsilylcyclopentadieyl, such as cyclopentadienyl, 4-isopropylcyclopentadienyl, 4-tert-butylcyclopentadienyl, 4-(2,2-dimethylpent-3-yl)cyclopentadienyl, 4-(2,2-dimethylbut-3-yl)cyclopentadienyl or 4-trimethylsilylcyclopentadienyl, such as cyclopentadienyl, 4-isopropylcyclopentadienyl, or 4-trimethylsilylcyclopentadienyl. In some embodiments, $L^4$ is hydrocarbyl or silylcarbyl substituted cyclopentadienyl with the substitutions on the 3- and 5-positions of the cyclopentadienyl ring, such as 3,5-dimethylcyclopentadienyl, 3,5-diethylcyclopentadienyl, 3,5-dipropylcyclopentadienyl, 3,5-dibutylcyclopentadienyl, 3,5-dipentylcyclopentadienyl, 3,5-dihexylcylopentadienyl, 3,5-dibenzylcyclopentadienyl, or 3,5-bis(trimethylsilyl) cyclopentadieyl, such as 3,5-dimethylcyclopentadienyl, 3,5-diisopropylcyclopentadienyl, 3,5-di-tert-butylcyclopentadienyl, 3,5-dicyclopentylcyclopentadienyl, 3,5-dipent-3-ylcyclopentadienyl, 3,5-dicyclohexylcylopentadienyl, 3,5-dibenzylcyclopentadienyl, or 3,5-bis(trimethylsilyl)cyclopentadienyl, such as 3,5-dimethylcyclopentadienyl, 3,5-diisopropylcyclopentadienyl, 3,5-di-tert-butylcyclopentadienyl, 3,5-dibenzylcyclopentadienyl, or 3,5-bis(trimethylsilyl)cyclopentadieyl. In some embodiments, each G' and G" are methylene, dimethylmethylene, dimethylsilylene, such as dimethylmethylene or dimethylsilylene; such as dimethylsilylene. In some embodiments, each X is hydrocarbyl or halo, such as methyl, benzyl, fluoro or chloro, such as methyl or chloro. In some embodiments, M is zirconium. In alternative embodiments, M is hafnium.

A subset of the metallocene compounds (pre-catalysts) represented by formula (3) that may be used include those having $C_s$ or pseudo-$C_s$ symmetry are represented by formula (3a):

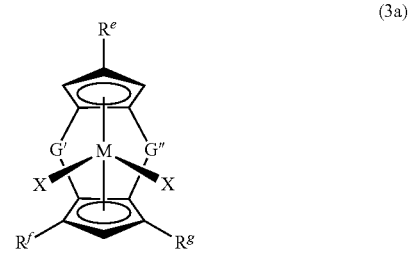
(3a)

wherein M, G', G", and X are defined as in formula (3);
$R^e$ is selected from hydrogen or a hydrocarbyl, substituted hydrocarbyl, halocarbyl, substituted halocarbyl, silylcarbyl or germylcarbyl radicals;
each $R^f$ and $R^g$ are selected from hydrocarbyl, substituted hydrocarbyl, halocarbyl, substituted halocarbyl, silylcarbyl, or germylcarbyl, with the proviso that each $R^f$ and $R^g$ are chosen to allow the compound to be $C_s$-symmetric or pseudo $C_s$-symmetric.

In some embodiments of formula (3a), each $R^f$ and $R^g$ are independently hydrocarbyl or silylcarbyl, such as methyl, ethyl, propyl, butyl, pentyl, hexyl, benzyl, or trimethylsilyl, such as methyl, isopropyl, tert-butyl, cyclopentyl, pent-3-yl, cyclohexyl, benzyl, or trimethylsilyl, such as methyl, isopropyl, tert-butyl, benzyl or trimethylsilyl. In some embodiments, $R^e$ is hydrogen, hydrocarbyl or silylcarbyl, such as methyl, ethyl, propyl, butyl, pentyl, hexyl, heptyl, octyl, or trimethylsilyl; such as hydrogen, isopropyl, tert-butyl, 2,2-dimethylpent-3-yl, 2,2-dimethylbut-3-yl, or trimethylsilyl, such as hydrogen, isopropyl or trimethylsilyl.

In some embodiments, a catalyst of formula (3) is:

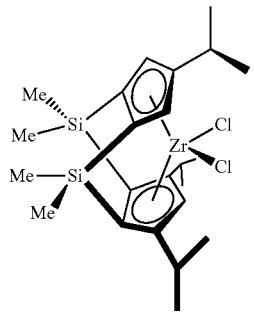

In some embodiments of formulas 1, 1a, 1b, 2, 3, or 3a, G, G' and G" are selected from $R^*_2C$, $R^*_2Si$, $R^*_2Ge$, $R^*_2CCR^*_2$, $R^*C=CR^*$, $R^*_2CSiR^*_2$, $R^*_2SiSiR^*_2$, $R^*B$, $R^*_2C-BR^*$, $R^*N$, $R^*P$, O, S, and Se, where each $R^*$ is independently selected from hydrogen, $C_1$-$C_{20}$ containing hydrocarbyl, substituted hydrocarbyl, halocarbyl, substituted halocarbyl, silylcarbyl or germylcarbyl substituent and optionally two or more adjacent $R^*$ may join to form a substituted or unsubstituted, saturated, partially unsaturated, cyclic or polycyclic substituent. In some embodiments, G, G' and G" are selected from $R^*_2C$, $R^*_2Si$, $R^*_2Ge$, $R^*_2CCR^*_2$, $R^*B$, $R^*N$, $R^*P$, O, S, and Se, where each $R^*$ is independently selected from hydrogen, $C_1$-$C_{20}$ containing hydrocarbyl, substituted hydrocarbyl, halocarbyl, substituted halocarbyl, silylcarbyl or germylcarbyl substituent and optionally two or more adjacent $R^*$ may join to form a substituted or unsubstituted, saturated, partially unsaturated, cyclic or polycyclic substituent. In some embodiments, G, G' and G" are independently selected from $R^*_2C$, $R^*_2Si$, and $R^*_2CCR^*_2$ where each $R^*$ is independently selected from hydrogen, $C_1$-$C_{20}$ containing hydrocarbyl, substituted hydrocarbyl, halocarbyl, substituted halocarbyl, silylcarbyl or germylcarbyl substituent and optionally two or more adjacent $R^*$ may join to form a substituted or unsubstituted, saturated, partially unsaturated, cyclic or polycyclic substituent.

Catalysts capable of making the syndiotactic propylene-α-olefin copolymers described herein may also include compounds (pre-catalysts) having a structure represented by formula (4) having $C_2$ symmetry:

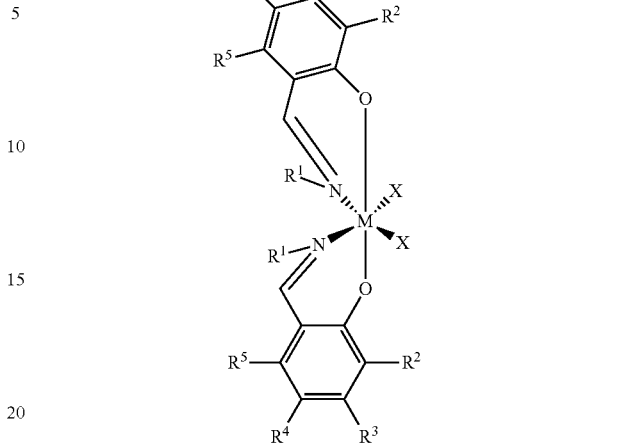

wherein:
M is zirconium or titanium;
O is oxygen;
N is nitrogen;
$R^1$ is hydrocarbyl, substituted hydrocarbyl, halocarbyl, substituted halocarbyl, silylcarbyl or germylcarbyl, such as $R^1$ is halocarbyl;
$R^2$ is hydrocarbyl, substituted hydrocarbyl, halocarbyl, substituted halocarbyl, silylcarbyl or germylcarbyl, such as $R^2$ is hydrocarbyl having three or more carbon atoms or silylcarbyl having three or more carbon atoms;
each of $R^3$, $R^4$, and $R^5$ is independently hydrogen or a hydrocarbyl, substituted hydrocarbyl, halocarbyl, substituted halocarbyl, silylcarbyl or germylcarbyl, such as $R^3$, $R^4$ and $R^5$ are hydrogen; each X is independently a hydride radical, hydrocarbyl, substituted hydrocarbyl, halocarbyl, substituted halocarbyl, silylcarbyl or germylcarbyl; or both X are joined and bound to the metal atom to form a metallacycle ring containing from about 3 to about 20 carbon atoms; or both together can be an olefin, diolefin or aryne ligand; both X may independently be a halogen, alkoxide, aryloxide, amide, phosphide or other univalent anionic ligand or both X can also be joined to form a dianionic chelating ligand.

In some embodiments of formula (4), $R^1$ is hydrocarbyl or halocarbyl radical, such as methyl, ethyl, propyl, butyl, pentyl, hexyl, benzyl, phenyl, methylphenyl, dimethylphenyl, ethylphenyl, diethylphenyl, propylphenyl, dipropylphenyl, perfluorophenyl, trifluorphenyl, difluorophenyl, or fluorophenyl, such as phenyl, 2-methylphenyl, 2,6-dimethylphenyl, 2-isopropylphenyl, perfluorophenyl, 2,4,6-trifluorophenyl, 2,6-difluorophenyl, 3,5-difluorophenyl or 4-fluorophenyl, such as perfluorophenyl. In some embodiments, $R^2$ is hydrocarbyl or silylcarbyl radicals, such as $C_3$-$C_{12}$ hydrocarbyl or $C_3$-$C_{12}$ silylcarbyl, such as propyl, butyl, pentyl, hexyl, heptyl, octyl, cumyl, or trimethylsilyl, such as isopropyl, tert-butyl, cumyl, or trimethylsilyl, such as tert-butyl or trimethylsilyl. In some embodiments, $R^3$, $R^4$, and $R^5$ are independently hydrogen or hydrocarbyl radicals. In some embodiments, each X is hydrocarbyl or halo, such as methyl, benzyl, fluoro or chloro, such as methyl or chloro. In some embodiments, M is titanium.

In some embodiments, a catalyst compound of formula (4) is:

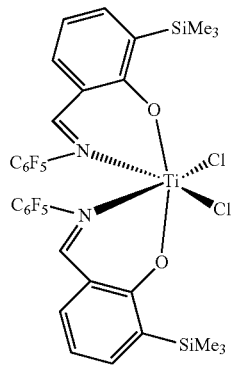

Activators and Catalyst Activation

The terms "cocatalyst" and "activator" are used herein interchangeably and are defined to be any compound which can activate any one of the pre-catalyst compounds described above by converting the neutral pre-catalyst compound to a catalytically active cationic compound. Non-limiting activators, for example, include alumoxanes, aluminum alkyls, ionizing activators, which may be neutral (Lewis acid activators) or ionic (ionic activators), and conventional-type cocatalysts. Activators may include alumoxane compounds, modified alumoxane compounds, or ionizing anion precursor compounds that abstract a reactive, σ-bound, metal ligand making the metal complex cationic and providing a charge-balancing noncoordinating or weakly coordinating anion.

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. A visually clear methylalumoxane can be used. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), at least one embodiment selects the maximum amount of activator typically at up to a 5000-fold molar excess Al/M over the catalyst compound (per metal catalytic site). The minimum activator-to-catalyst-compound is a 1:1 molar ratio. Alternative suitable ranges include from 1:1 to 500:1, alternatively from 1:1 to 200:1, alternatively from 1:1 to 100:1, or alternatively from 1:1 to 50:1.

In an alternative embodiment, little or no alumoxane is used in the polymerization processes described herein. For example, alumoxane is present at zero mole %, alternatively the alumoxane is present at a molar ratio of aluminum to catalyst compound transition metal less than 500:1, such as less than 300:1, such as less than 100:1, such as less than 1:1.

Lewis acid activators include triphenylboron, tris-perfluorophenylboron, tris-perfluorophenylaluminum, but exclude the class of activators referred to as alumoxanes. Ionic activators include dimethylanilinium tetrakisperfluorophenylborate, triphenylcarbonium tetrakisperfluorophenylborate, dimethylanilinium tetrakisperfluorophenylaluminate. Lewis acid activators and ionic activators are referred to as stoichiometric activators since relatively low molar ratios of activator to transition metal compound are needed as compared to alumoxane activators that require large excess of activator relative to transition metal compound.

Neutral or ionic activators such as tri(n-butyl)ammonium tetrakis(pentafluorophenylborate), trisperfluorophenylboron, trisperfluoronaphthylboron, polyhalogenated heteroborane anions, boric acid, or combinations thereof may also be used.

Stoichiometric activators (at times used in combination with a co-activator) may be used in producing the syndiotactic polypropylene homopolymers described herein. For example, activators such as [Me$_2$PhNH][B(C$_6$F$_5$)$_4$], [Ph$_3$C][B(C$_6$F$_5$)$_4$], [Me$_2$PhNH][B(C$_6$H$_3$-3,5-(CF$_3$)$_2$)$_4$], [Ph$_3$C][B(C$_6$H$_3$-3,5-(CF$_3$)$_2$)$_4$], [NH$_4$][B(C$_6$H$_5$)$_4$], [Me$_2$PhNH][B(C$_{10}$F$_7$)$_4$], [Ph$_3$C][B(C$_{10}$F$_7$)$_4$], [di(hydrogenated tallow)MeNH][B(C$_6$F$_5$)$_4$], [di(hydrogenated tallow)MeNH][B(C$_{10}$F$_7$)$_4$], [(C$_{18}$H$_{37}$)$_2$MeNH][B(C$_6$F$_5$)$_4$], [(C$_{18}$H$_{37}$)$_2$MeNH][B(C$_{10}$F$_7$)$_4$], or Lewis acidic activators such as B(C$_6$F$_5$)$_3$ or B(C$_6$H$_5$)$_3$ are used, where Ph is phenyl, Me is methyl. C$_{18}$H$_{37}$ is octadecyl, C$_6$F$_5$ is perfluorophenyl and C$_{10}$F$_7$ is perfluoronaphthyl. Additional useful activators include:

N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate].
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate], N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl)borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-decyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl)borate],
N-methyl-N-hexadecylanilinium [tetrakis(perfluorophenyl)borate],
N-methyl-N-tetradecylanilinium [tetrakis(perfluorophenyl)borate],
N-methyl-N-dodecylanilinium [tetrakis(perfluorophenyl)borate],
N-methyl-N-decylanilinium [tetrakis(perfluorophenyl)borate], and N-methyl-N-octylanilinium [tetrakis(perfluorophenyl)borate]

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. For example, the three substituent groups are independently selected from halogen, mono or multicyclic (including halo-substituted) aryls, alkyls, and alkenyl compounds and mixtures thereof, for example can be alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). In some embodiments, the three substituent groups are alkyls having 1 to 4 carbon groups, phenyl, naphthyl or mixtures thereof. In some embodiments, the three substituent groups are halogenated, such as fluorinated aryl groups. In some embodiments, the neutral stoichiometric activator is tris(perfluorophenyl)boron or tris(perfluoronaphthyl)boron.

Ionic stoichiometric activator compounds may contain an active proton, or some other cation associated with, but not coordinated to, or only loosely coordinated to, the remaining ion of the ionizing compound. Such compounds are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299, 5,502,124, and U.S. Pat. No. 5,972,823, and publications US2021079537, WO2021/086467, US2019/0330169, and US2019/0330392, all of which are herein incorporated by reference.

Ionic catalysts can be prepared by reacting a transition metal compound with an activator, such as $B(C_6F_6)_3$, which upon reaction with the hydrolyzable ligand (X') of the transition metal compound forms an anion, such as ([B(C_6F_5)_3(X')]^-), which stabilizes the cationic transition metal species generated by the reaction. The catalysts can be prepared with activator components which are ionic compounds or compositions. However preparation of activators utilizing neutral compounds is also contemplated.

Compounds useful as an activator component in the preparation of the ionic catalyst systems used in the process may comprise a cation, which can be a Brønsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988:1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In at least one embodiment, the ionic stoichiometric activators include a cation and an anion component, and may be represented by the following formula:

$(L^{}-H)_d^+(A^{d-})$ wherein $L^{}$ is an neutral Lewis base; H is hydrogen; $(L^{**}-H)+$ is a Brønsted acid, and $A^{d-}$ is a non-coordinating anion having the charge d−, and d is an integer from 1 to 3.

The cation component $((L^{**}-H)_d^+)$ may include Brønsted acids such as protons or protonated Lewis bases or reducible Lewis acids capable of protonating or abstracting a moiety, such as an alkyl or aryl, from the precatalyst after alkylation.

The activating cation $(L^{}-H)_d^+$ 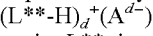 may be a Brønsted acid, capable of donating a proton to the alkylated transition metal catalytic precursor resulting in a transition metal cation, including ammoniums, oxoniums, phosphoniums, silyliums, and mixtures thereof, such as ammoniums of methylamine, aniline, diethylamine, dimethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether, diethyl ether, tetrahydrofuran and dioxane, sulfoniums from thioethers, such as diethyl thioethers and tetrahydrothiophene, and mixtures thereof. The activating cation $(L^{}-H)_d^+$ may also be a moiety such as silver, tropylium, carbeniums, ferroceniums and mixtures, such as carboniums and ferroceniums; such as triphenyl carbonium. The anion component $A^{d-}$ include those having the formula $[M^{k+}Q_n]^{d-}$ wherein k is an integer from 1 to 3; n is an integer from 2-6; n−k=d; M is an element selected from group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. For example, each Q is a fluorinated hydrocarbyl group having 1 to 20 carbon atoms, such as each Q is a fluorinated aryl group, such as each Q is a pentafluoryl aryl group. Examples of suitable $A^{d-}$ also include diboron compounds as disclosed in U.S. Pat. No. 5,447,895, which is fully incorporated herein by reference.

In some embodiments, boron compounds which may be used as a non-coordinating anion activator in combination with a co-activator in the preparation of the catalysts of this disclosure are tri-substituted ammonium salts such as: trimethylammonium tetraphenylborate, triethylammonium tetraphenylborate, tripropylammonium tetraphenylborate, tri(n-butyl)ammonium tetraphenylborate, tri(tert-butyl) ammonium tetraphenylborate, N,N-dimethylanilinium tetraphenylborate, N,N-dicthylanilinium tetraphenylborate, N,N-dimethyl-(2,4,6-trimethylanilinium) tetraphenylborate, trimethylammonium tetrakis(pentafluorophenyl)borate, tricthylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate,
trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(tert-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(tert-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, and dialkyl ammonium salts such as: di-(isopropyl)ammonium tetrakis(pentafluorophenyl)borate, and dicyclohexylammonium tetrakis(pentafluorophenyl)borate; and other salts such as tri(o-tolyl)phosphonium tetrakis(pentafluorophenyl)borate, tri(2,6-dimethylphenyl)phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluorophenyOborate, triphenylphosphonium tetrakis(pentafluorophenyl)borate, triethylsilylium tetrakis(pentafluorophenyl)borate, benzene(diazonium) tetrakis (pentafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis (perfluoronaphthyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium) tetrakis (perfluorobiphenyl)borate, tropillium tetrakis (3,5-bis (trifluoromethyl)phenyl)borate, triphenylcarbenium tetrakis (3,5-bis(trifluoromethyl)phenyl)borate,
triphenylphosphonium tetrakis(3,5-bis(trifluoromethyl)phenyl)borate, triethylsilylium tetrakis(3,5-bis(trifluoromethyl) phenyl)borate, and benzene(diazonium) tetrakis(3,5-bis(trifluoromethyl)phenyl)borate.

In some embodiments, the non-coordinating anion activator, $(L^{**}-H)_d^+(A^{d-})$, is N,N-dimethylanilinium tetrakis (perfluorophenyl)borate, N,N-dimethylanilinium tetrakis (perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3, 5-bis(trifluoromethyl)phenyl)borate, or triphenylcarbenium tetra(perfluorophenyl)borate.

The catalyst precursors can also be activated with cocatalysts or activators that comprise non-coordinating anions containing metalloid-free cyclopentadienide ions, as described in U.S. Patent Publication 2002/0058765 A1, and for the instant disclosure, require the addition of a co-activator to the catalyst pre-cursor. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Example non-coordinating anions useful in accordance with this disclosure are those that are compatible, stabilize the transition metal complex cation in the sense of balancing its ionic charge at +1, and yet retain sufficient liability to permit displacement by an ethylenically or acetylenically unsaturated monomer during polymerization. These types of cocatalysts are sometimes used with scavengers such as but not limited to tri-iso-butylaluminum, tri-n-octylaluminum, tri-n-hexylaluminum, triethylaluminum or trimethylaluminum.

Disclosure processes also can employ cocatalyst compounds or activator compounds that are initially neutral Lewis acids but form a cationic metal complex and a non-coordinating anion, or a zwitterionic complex upon reaction with the alkylated transition metal compounds. The alkylated metallocene compound is formed from the reaction of the catalyst pre-cursor and the co-activator. For example, tris (pentafluorophenyl) boron or aluminum act to abstract a hydrocarbyl ligand to yield an disclosure cationic transition metal complex and stabilizing non-coordinating anion, see EP-A-0 427 697 and EP-A-0 520 732 for illustrations of analogous group-4 metallocene compounds. Also, see the methods and compounds of EP-A-0 495 375. For formation of zwitterionic complexes using analogous group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

When the cations of non-coordinating anion activators are Brønsted acids such as protons or protonated Lewis bases (excluding water), or reducible Lewis acids such as ferrocenium or silver cations, or alkali or alkaline carth metal cations such as those of sodium, magnesium or lithium, the catalyst-precursor-to-activator molar ratio may be any ratio. Combinations of the described activator compounds may also be used for activation.

When an ionic or neutral stoichiometric activator (such as an NCA) is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:500 to 1:1, 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

In some embodiments, activators and activator/co-activator combinations include dimethylanilinium tetrakis(pentafluorophenyl)borate or tris(pentafluorophenyl)boron, or mixtures of trialkyl aluminum with dimethylanilinium tetrakis(pentafluorophenyl)borate or tris(pentafluorophenyl) boron. In some embodiments, scavenging compounds are used with activators. Typical aluminum or boron alkyl components useful as scavengers are represented by the general formula $R^{X}J'Z'_2$ where J' is aluminum or boron, $R^x$ is as previously defined above, and each Z' is independently $R^x$ or a different univalent anionic ligand such as halogen (Cl, Br, I), alkoxide ($OR^X$) and the like. Aluminum alkyls can include triethylaluminum, diethylaluminum chloride, tri-iso-butylaluminum, tri-n-octylaluminum, tri-n-hexylaluminum, trimethylaluminum and the like. Boron alkyls can include triethylboron. Scavenging compounds can be alumoxanes and modified alumoxanes including methylalumoxane and modified methylalumoxane.

Supported Catalysts

Supported catalysts or supported catalyst systems may be used to prepare the syndiotactic polypropylene homopolymers. To prepare uniform supported catalysts, the catalyst precursor may dissolve in the solvent used to dispose the catalyst (and activator) onto the support. The term "uniform supported catalyst" means that the catalyst precursor, the activator, and or the activated catalyst approach uniform distribution upon the support's accessible surface area, including the interior pore surfaces of porous supports. Some embodiments of supported catalysts have uniform supported catalysts.

Useful supported catalyst systems may be prepared by any method effective to support other coordination catalyst systems, effective meaning that the catalyst so prepared can be used for polymerizing olefins in a heterogeneous process. The catalyst precursor, activator, co-activator (if needed), suitable solvent, and support may be added in any order or simultaneously.

In some embodiments, the activator (with or without co-activator), dissolved in an appropriate solvent such as toluene, may be stirred with the support material for 1 minute to 10 hours to prepare the supported catalyst. The total solution volume (of the catalyst solution, the activator solution or both) may be greater than the pore volume of the support, but some embodiments limit the total solution volume below that needed to form a gel or slurry (90% to 400%, such as 100-200%, of the pore volume). The mixture is optionally heated from 30-200° C. during this time. The catalyst precursor may be added to this mixture as a solid, if a suitable solvent is employed in the previous step, or as a solution. Alternatively, the mixture can be filtered, and the resulting solid mixed with a catalyst precursor solution. Similarly, the mixture may be vacuum-dried and mixed with a catalyst precursor solution. The resulting catalyst mixture is then stirred for 1 minute to 10 hours, and the supported catalyst is either filtered from the solution and vacuum dried or subjected to evaporation to remove the solvent.

Alternatively, the catalyst precursor and activator (and optional co-activator) may be combined in solvent to form a solution. The support is then added to the solution, and the resulting mixture is stirred for 1 minute to 10 hours. The total activator/catalyst-precursor solution volume may be greater than the pore volume of the support, but some embodiments limit the total solution volume below that needed to form a gel or slurry (90% to 400%, such as 100-200% of the pore volume). After stirring, the residual solvent is removed under vacuum, typically at ambient temperature and over 10-16 hours; however, greater or lesser times and temperatures may be used.

The catalyst precursor may also be supported absent the activator, where the activator (and co-activator if needed) is added to the liquid phase of a slurry process. For example, a solution of catalyst precursor may be mixed with a support material for a period of 1 minute to 10 hours. The resulting precatalyst mixture may be filtered from the solution and dried under vacuum or treated with evaporation to remove the solvent. The total catalyst-precursor-solution volume may be greater than the support's pore volume, but some embodiments limit the total solution volume below that needed to form a gel or slurry (e.g., 90% to 400%, such as 100-200% of the pore volume).

Additionally, two or more different catalyst precursors may be placed on the same support using any of the support methods disclosed above. Likewise, two or more activators or an activator and a co-activator, may be placed on the same support.

Suitable solid particle supports are typically comprised of polymeric or refractory oxide materials, e.g., each being porous. Any suitable support material that has an average particle size greater than 10 µm is suitable for use in this disclosure. Various embodiments include a porous support material, such as for example, talc, inorganic oxides, inorganic chlorides, for example magnesium chloride and resinous support materials such as polystyrene polyolefin or polymeric compounds or any other organic support material and the like. Some embodiments include inorganic oxide materials as the support material including group-2,-3,-4,-5,-13, or -14 metal or metalloid oxides. Some embodiments include the catalyst support materials to include silica, alumina, silica-alumina, and their mixtures. Other inorganic oxides may serve either alone or in combination with the silica, alumina, or silica-alumina, such as magnesia, titania, zirconia, and the like. Lewis acidic materials such as montmorillonite and similar clays may also serve as a support, where the support can optionally double as an activator component. Additional activator may also be used in such embodiments. In some cases, a special family of solid support commonly known as MCM-41 can also be used. MCM-41 is a class of unique crystalline support and can be prepared with tunable pore size and tunable acidity when modified with a second component. A detailed description of MCM-41 class of materials and their modification can be found in U.S. Pat. No. 5,264,203.

The support material may be pretreated by any number of methods. For example, inorganic oxides may be calcined, chemically treated with dehydroxylating agents such as aluminum alkyls and the like, or both.

Polymeric carriers will also be suitable in accordance with the disclosure, see for example the descriptions in WO 95/15815 and U.S. Pat. No. 5,427,991. The methods disclosed may be used with the catalyst compounds, activators or catalyst systems of this disclosure to adsorb or absorb them on the polymeric supports, particularly if made up of porous particles, or may be chemically bound through functional groups bound to or in the polymer chains.

Useful catalyst carriers typically have a surface area of from 10-700 $m^2/g$, and or a pore volume of 0.1-4.0 cc/g and or an average particle size of 10-500 μm. Some embodiments select a surface area of 50-500 $m^2/g$, and or a pore volume of 0.5-3.5 cc/g, and or an average particle size of 20-200 μm. Other embodiments select a surface area of 100-400 $m^2/g$, and or a pore volume of 0.8-3.0 cc/g, and or an average particle size of 30-100 μm. In some embodiments, a carrier has a pore size of 10-1000 Ångströms, alternatively 50-500 Ångströms, or 75-350 Ångströms.

The precatalyst and or the precatalyst/activator combinations are generally deposited on the support at a loading level of 10-100 micromoles of catalyst precursor per gram of solid support; alternatively 20-80 micromoles of catalyst precursor per gram of solid support; or 40-60 micromoles of catalyst precursor per gram of support. But greater or lesser values may be used provided that the total amount of solid catalyst precursor does not exceed the support's pore volume.

The precatalyst and or the precatalyst/activator combinations can be supported for gas-phase, bulk, or slurry polymerization, or otherwise as needed. Numerous support methods are known for catalysts in the olefin polymerization art, particularly alumoxane-activated catalysts; all are suitable for use herein. See, for example, U.S. Pat. Nos. 5,057,475 and 5,227,440. An example of supported ionic catalysts appears in WO 94/03056. U.S. Pat. No. 5,643,847 and WO 96/04319A which describe a particularly effective method. Both polymers and inorganic oxides may serve as supports, see U.S. Pat. Nos. 5,422,325, 5,427,991, 5,498,582 and 5,466,649, and international publications WO 93/11172 and WO 94/07928.

In some embodiments, the precatalyst and or activator (with or without a support) are combined with an alkylaluminum compound, such as a trialkylaluminum compound, prior to entering the reactor. For example, the alkylaluminum compound can be represented by the formula: $R_3Al$, where each R is independently a $C_1$ to $C_{20}$ alkyl group; such as the R groups are independently selected from methyl, ethyl, propyl, isopropyl, butyl, isobutyl, n-butyl, pentyl, isopentyl, n-pentyl, hexyl, isohexyl, n-hexyl, heptyl, octyl, isooctyl, n-octyl, nonyl, isononyl, n-nonyl, decyl, isodecyl, n-decyl, undecyl, isoundecyl, n-undecyl, dodecyl, isododecyl, and n-dodecyl, such as isobutyl, n-octyl, n-hexyl, and n-dodecyl. In some embodiments, the alkylaluminum compound is selected from tri-isobutyl aluminum, tri n-octyl aluminum, tri-n-hexyl aluminum, and tri-n-dodecyl aluminum.

Chain Transfer Agent

Polymerization processes of the present disclosure may include polymerization in the presence of a chain transfer agent or chain shuttling agent.

Chain transfer agents include alkylaluminum compounds represented by the formula: $R_3Al$, where each R is, independently, a $C_1$ to $C_{18}$ alkyl group, such as each R is, independently, selected from methyl, ethyl, n-propyl, isopropyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecyl, n-hexadecyl, n-heptadecyl, n-octadecyl, and their iso-analogs.

In the process, hydrogen can also be used as a useful chain transfer agent in the reaction. In some embodiments, alternative chain transfer agents can be used in the processes described herein, reducing the need for hydrogen wherein hydrogen is absent or used in limited amounts. In some embodiments, chain transfer agents include diethylzinc, and trialkylaluminums such as triisobutylaluminum, tri-n-octylaluminum, triethylaluminum and the like, or mixtures thereof.

In some embodiment, the chain transfer agent can be used at a molar ratio of the chain transfer agent to the transition metal compound of from 1:1 to 150:1. In at least one embodiment, the molar ratio of chain transfer agent to the transition metal compound can be greater than 5:1, or greater than 10:1, or greater than 20. Likewise, the molar ratio of chain transfer agent to the transition metal compound can be less than 120:1, or less than 100:1, or less than 80:1.

Properties of Syndiotactic Polypropylene Homopolymers

In some embodiments, a syndiotactic polypropylene homopolymer has 100 mole % propylene-derived units.

In some embodiments, a syndiotactic polypropylene homopolymer has a melt flow rate (MFR) as determined by ASTM D-1238 (230° C. 2.16 kg), of about 0.1 to about 700 g/10 min, such as about 0.1 to about 450 g/10 min, or about 0.1 to about 20 g/10 min, or about 0.2 to about 18 g/10 min, or about 0.5 to about 15 g/10 min, or about 0.8 to about 12 g/10 min, or about 1 to about 10 g/10 min, or about 2 to 10 g/10 min, or about 2.5 to 8 g/10 min, alternatively about 25 g/10 min to about 200 g/10 min, or about 50 g/10 min to about 150 g/10 min, or about 100 g/10 min to about 130 g/10 min, alternatively about 400 g/10 min to about 700 g/10 min, such as about 500 g/10 min to about 700 g/10 min, such as about 600 g/10 min to about 700 g/mol. In some embodiments of the invention, the MFR as determined by ASTM D-1238 (230° C. 2.16 kg) is too high to measure.

The stereoregularity of the syndiotactic polypropylene homopolymers can be determined by the catalyst, total monomer concentrations, and reactor temperature. It is believed that syndiotactic polypropylene homopolymers made according to processes of the present disclosure may comprise up to 99% r-dyads based on the total number of dyads present in the polymer, such as a racemic dyad (r-dyad) content (r %) of about 60% to about 95%, such as about 70% to about 90%, such as about 65% to about 85%. In some embodiments, the r % is greater than 60%, alternatively greater than 65%, alternatively greater than 70%, with an upper limit of 90% or less, alternatively 85% or less, alternatively 80% or less. In some embodiments, a syndiotactic polypropylene homopolymer has an r % of about 65% to about 80%, such as about 65% to about 75%, such as about 68% to about 73%, such as about 69% to about 71%, as determined by $^{13}C$ NMR.

In some embodiments, a syndiotactic polypropylene homopolymer has an [mmmm] pentad content of about 0.1% to about 1.5%, such as about 0.2% to about 1.2%, such as about 0.6% to about 1%, as determined by $^{13}C$ NMR. Alternatively, the syndiotactic polypropylene homopolymer has an [mmmm] pentad content of 2.0% or less. In some embodiments, a syndiotactic polypropylene homopolymer has an [mmmr] pentad content of about 0.7% to about 5%, such as about 2% to about 5%, such as about 2.5% to about 4.5%, such as about 3% to about 4%, as determined by $^{13}C$ NMR. In some embodiments, a syndiotactic polypropylene homopolymer has an [rmmr] pentad content of about 2% to about 5%, such as about 3.5% to about 5%, such as about 4% to about 5%, as determined by $^{13}C$ NMR. In some embodiments, a syndiotactic polypropylene homopolymer has an [mmrr] pentad content of about 4% to about 10%, such as about 7.5% to about 10%, such as about 7.5% to about 8.5%, alternatively about 8.5% to about 10%, alternatively, about 8% to about 9%, as determined by $^{13}C$ NMR. In some embodiments, a syndiotactic polypropylene homopolymer has an [mmrm+rmrr] pentad content of about 9% to about 25%, such as about 18% to about 25%, such as about 20% to about 23%, such as about 20% to about 21.5%, alternatively about 21.5% to about 23%, as determined by $^{13}C$ NMR. In some embodiments, a syndiotactic polypropylene homopolymer has an [rmrm] pentad content of about 2% to about 10%, such as about 7% to about 10%, such as about 7% to about 8%, alternatively about 8% to about 9%, alternatively about 9% to about 10%, as determined by $^{13}C$ NMR. In some embodiments, a syndiotactic polypropylene homopolymer has an [rrrr] pentad content of about 20% to about 65%, such as about 35% to about 65%, alternatively about 20% to about 35%, such as about 20% to about 27%, alternatively about 25% to about 32%, alternatively about 27% to about 35%, as determined by $^{13}C$ NMR. Alternatively, the syndiotactic polypropylene homopolymer has an [rrrr] pentad content of 20% or more. In some embodiments, a syndiotactic polypropylene homopolymer has an [mrrr] pentad content of about 14% to about 23%, such as about 17% to about 23%, such as about 19% to about 20%, alternatively about 20% to about 21%, alternatively about 19.5% to about 20.5%, as determined by $^{13}C$ NMR. In some embodiments, a syndiotactic polypropylene homopolymer has an [mrrm] pentad content of about 2% to about 7%, such as about 3% to about 7%, such as about 4% to about 6%, such as about 4.5% to about 5.5%, as determined by $^{13}C$ NMR.

The number average molecular weight (Mn) (DRI) of syndiotactic polypropylene homopolymers can be about 10,000 to about 250,000 g/mol, such as about 20,000 to about 150,000 g/mol, such as about 30,000 to about 100,000 g/mol, such as about 30,000 to about 70,000 g/mol, alternatively about 10,000 to about 70,000 g/mol, alternatively about 100,000 to about 250,000 g/mol, such as about 110,000 to about 180,000 g/mol.

The weight average molecular weight (Mw) (DRI) of syndiotactic polypropylene homopolymers can be about 10,000 to about 500,000 g/mol, such as about 20,000 to about 200,000 g/mol, such as about 30,000 to about 100,000 g/mol, such as about 50,000 to about 90,000 g/mol, alternatively about 100,000 to about 200,000 g/mol, alternatively about 200,000 to about 350,000 g/mol, such as about 250,000 to about 300,000 g/mol.

The molecular weight distribution MWD (Mw/Mn) (DRI) of syndiotactic polypropylene homopolymers can be less than about 5, for example, about 1 to about 3.0, such as about 1.2 to about 2.5, such as about 1.8 to about 2, alternatively about 1.8 to about 2.5, such as about 2 to about 2.3.

The z-average molecular weight (Mz) (LS) of syndiotactic polypropylene homopolymers can be about 30,000 to about 800,000 g/mol, such as about 30,000 to about 100,000 g/mol, alternatively about 200,000 to about 300,000 g/mol, alternatively about 300,000 to about 400,000 g/mol, alternatively about 400,000 to about 500,000 g/mol.

The z-average molecular weight (Mz) (DRI) of syndiotactic polypropylene homopolymers can be about 30,000 to about 800,000 g/mol, such as about 30,000 to about 100,000 g/mol, alternatively about 100,000 to about 300,000 g/mol, alternatively about 300,000 to about 500,000 g/mol, alternatively about 500,000 to about 700,000 g/mol.

Syndiotactic placement of propylene on the polymer chain has impact on the coil dimension of a syndiotactic polypropylene. A large radius of gyration is directly related to thickening efficiency of a viscosity modifier of a lubrication oil. In at least one embodiment, a syndiotactic polypropylene homopolymer has a radius of gyration of about 2 nm to about 70 nm, such as about 5 nm to about 50 nm. Radius of gyration ($R_g$) can be directly determined by measuring change in scattered light intensity with observation angle according to ASTM D4001. For example, radius of gyration can be measured using a Waters 150 gel permeation chromatograph equipped with a Multi-Angle Laser Light Scattering ("MALLS") detector, a viscosity detector, and a differential refractive index detector. The expansion of the coil dimension can be also measured using the intrinsic viscosity ratio ($g'_{vis}$) of the intrinsic viscosity of the syndiotactic propylene homopolymer to the intrinsic viscosity of a isotactic polypropylene of equal molecular weight. In at least one embodiment, a syndiotactic polypropylene homopolymer has an intrinsic viscosity ratio ($g'_{vis}$) of 1.05 to 1.6, such as 1.1 to 1.5. In some embodiments, the $g'_{vis}$ has a lower limit of 1.05 or greater, such as 1.1 or greater, such as 1.3 or greater, such as 1.4, with and upper limit of 1.6 or less, such as 1.5 or less, such as 1.4 or less.

In at least one embodiment, a syndiotactic polypropylene homopolymer has a glass transition temperature of about −20° C. to about 10° C., such as about −10° C. to about 0° C. $T_g$ can be measured according to ASTM D7426 at a scan rate of 10° C./min.

In some embodiments, a syndiotactic polypropylene homopolymer has a complex viscosity (at 0.1 rad/s, 190° C.) of about 50000 Pa*s or less, such as about 300 Pa*s to about 50000 Pa*s, such as about 400 Pa*s to about 40000 Pa*s, alternatively about 500 Pa*s to about 10000 Pa*s, alternatively about 500 Pa*s to about 10000 Pa*s. The complex viscosity can be measured by dynamic frequency sweep (DFS) measurements. Complex viscosity can be determined using a TA Instruments model ARES-G2 rheometer via small amplitude oscillatory shear (SAOS) testing at 190° C. Testing specimens can be compression molded using a heated press at 190° C. The testing specimens can have a diameter of 25 mm and a thickness of about 2 mm. The specimens are loaded into the rheometer which has been preheated to 190° C. and are trimmed to a measurement gap of 1.5 mm. The loaded, trimmed specimen is equilibrated at the testing temperature of 190° C. for 5 minutes prior to testing. Testing angular frequency is from 0.01 to 628 rad/s.

Differential Scanning Calorimetry (DSC)

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q200 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the *Polymer Handbook*, Fourth Edition, published by John Wiley and Sons, New York 1999, provided; however, that a value of 207 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of the polymer blends produced show a secondary melting/cooling peak overlapping with the principal peak, which peaks are considered together as a single melting/cooling peak. The highest of these peaks is considered the peak melting temperature/crystallization point. For the polymers having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Gel Permeation Chromotography with Three Detectors (GPC-3D)

Mw, Mn and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at a temperature of 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$ using the following equation:

$$c = K_{DRI} I_{DRI}/(dn/dc)$$

where $K_{DRI}$ is a constant determined by calibrating the DRI, and (dn/dc) is the refractive index increment for the system. The DRI molecular weight (or the conventional molecular weight) is determined by combining universal calibration relationship with the column calibration which is performed with a series of monodispersed polystyrene (PS) standards. The MW at each elution volume is calculated with following equation:

$$\log M = \frac{\log(K_{PS}/K)}{a+1} + \frac{a_{PS}+1}{a+1} \log M_{PS}$$

where the variables with subscript "PS" stand for polystyrene while those without a subscript are for the test samples. In this method, $\alpha_{OS}=0.67$ and $K_{PS}=0.000175$ dL/g. $\alpha=0.705$ and $K=0.0002288$ dL/g were used for the propylene homopolymer described herein.

The LS detector is a Wyatt Technology High Temperature DAWN HELEOSII. The molecular weight, M, at each point in the chromatogram is determined by analyzing the LS output using the Zimm model for static light scattering (M.B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. P(θ) is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm. For purposes of the present disclosure and the claims thereto (dn/dc)=0.1048 and the second virial coefficient A2=0.0006 for all polypropylene polymer. Units of parameters used throughout this description of the GPC method are: concentration is expressed in g/cm3, molecular weight is expressed in g/mol.

A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, [η], at each point in the chromatogram was calculated from the following equation:

$$\eta_s = c[\eta] + 0.3(c[\eta])^2$$

where c is concentration and was determined from the DRI output.

$g'_{vis}$ is defined as the ratio of the intrinsic viscosity of the syndiotactic propylene homopolymer to the intrinsic viscosity of an isotactic polypropylene of equal molecular weight, and was calculated using the output of the SEC-DRI-LS-VIS method as follows. The average intrinsic viscosity, $[\eta]_{avg}$, of the sample was calculated by:

$$[\eta]_{avg} = \frac{\Sigma c_i[\eta]_i}{\Sigma c_i}$$

where the summations are over the chromatographic slices, i, between the integration limits.

$g'_{vis}$ is defined as:

$$g'_{vis} = \frac{[\eta]_{avg}}{\eta_{ipp}}$$

$\eta_{ipp}$ is the intrinsic viscosities of the isotactic PP with the same molecular weight as the syndiotactic propylene homopolymer sample. The intrinsic viscosity of the isotactic PP of equal molecular weight is calculated using Mark-Houwink equation using K=0.0002288 dL/g. α=0.705 and a viscosity-average molecular weight based on molecular weights determined by LS detector.

Lubricating Oils

Described herein are lubricating oils including one or more syndiotactic polypropylene homopolymers and one or more base oils (also referred to as "base stocks"). The base oil or base stock may include Group I to Group V base oils with viscosity range from 1.5 to 100 cSt at 100° C.

In general, a lubricating oil's viscosity index provides an indication of how much the lubricating oil's viscosity changes with changing temperature. A lubricating oil possessing a high viscosity index would experience less change in its viscosity with temperature than would a lubricating oil possessing a low viscosity index. Hence, lubricating oils for equipment that operates under wide-ranging environmental conditions, such as extreme high and low temperature conditions, should possess high viscosity indexes. Although high viscosity indexes may be achieved by including particular viscosity modifiers in a lubricating oil's formulation, the use of such additives is not always beneficial. For example, technological advances in engines, mechanisms, and pumps have led to smaller engines producing more power, mechanisms operating at faster speeds, and smaller pumps generating higher pressures than their predecessors. Such operational improvements as these place increased needs on lubricating oils to operate effectively at higher temperatures, higher pressures, and under more severe shear conditions. A reduction gear box, for example, may operate with components that are rapidly rotating, potentially causing detrimental shearing of viscosity index improvers in the lubricating oil. Once a viscosity modifier molecule has been sheared, it might no longer be effective, and thus the lubricating oil's viscosity profile and efficacy worsen, eventually to the detriment of the equipment. Thus, it may be desirable to formulate lubricating oils having high viscosity indexes that are derived at least in part from the indigenous properties of the viscosity modifier(s).

Fluid rheology at low temperatures may be considered to concern "fluidity" or "pumpability"—a measure of the case (or difficulty) to pump a fluid at low temperatures. Low temperature rheological performance is most critical for mechanical devices, such as machines and vehicles, operating in cold environments, and particularly when such mechanical devices are started in motion from rest. When at rest, a mechanical device may not have lubricating oil effectively distributed to its moving parts, and therefore contacting surfaces may experience levels of friction and wear upon start-up of the mechanical device that are greater than those experienced during normal running. Such greater levels of friction and wear may be detrimental to the mechanical device's operating efficiency and longevity. The ability of a lubricating oil to counter this wear may be compromised at low temperatures. Firstly, a lubricating oil's viscosity tends to increase with decreasing temperature, and thus it becomes difficult to distribute the lubricating oil effectively at low temperatures. Secondly, the lubricating oil may experience the onset of wax crystallization at low temperatures, which may compound the effective distribution problem. Thirdly, these two effects hinder the migration of additive chemicals through the lubricating oil. Many anti-wear and extreme pressure additives designed to mitigate metal-on-metal wear operate by reacting with metal surfaces. Thus, the additives' effectiveness depends at least in part on the additives coming into contact with the metal surfaces. The hindrance of migration of additives within a fluid inhibits the contacting of metal surfaces by the additives, and therefore the additives may be less effective than when operating at higher temperatures.

To combat the above effects, a lubricating oil may be formulated so that it can be relatively easily pumped upon cold start-up of the mechanical device so that the lubricating oil and the additives may become effectively distributed to the moving parts within a short time interval. A typical rheological measure for a lubricating oil is it's viscosity at low temperatures. Generally, the lower the viscosity at a given cold temperature, the more effectively the lubricating oil will be distributed upon start-up of the mechanical device, and the less detrimental a cold start-up will be to that device. For machines such as motor vehicle engines that rely on electrical energy from a battery to start up, there can be a problem in that the energy needed for start-up at cold temperatures is compounded by the energy needed to pump a highly viscous lubricating oil, but the battery itself suffers from reduced power output at cold temperatures. Thus, a lubricating oil having lower viscosities at cold temperatures may at least partially compensate for the battery's reduced power output at cold temperatures.

In some embodiments, a lubricating oil may have at least 50 wt % of a base oil based on the weight of the lubricating oil composition. For example, the base oil may be present in the lubricating oil composition in an amount of at least 60 wt %, or at least 70 wt %, or at least 80 wt %, or at least 90 wt % or even at least 95 wt %, or at least 96 wt %, or at least 97 wt %, or at least 98 wt %, based on the weight of the lubricating oil.

In some embodiments, the amount of syndiotactic polypropylene homopolymers present in the lubricating oil composition may be about 0.1 wt % or greater, such as about 0.1 wt % to about 15 wt %, such as about 0.1 wt % to about 10 wt %, or about 0.2 wt % to about 8 wt %, or about 0.3 wt % to about 7 wt %, or about 0.4 wt % to about 5 wt %, or about 0.5 wt % to about 3 wt %, such as about 1 wt % to about 2 wt %, based on the weight of the lubricating oil.

The syndiotactic polypropylene homopolymers produced herein can be optionally combined with one or more other additives, which include, but are not limited to, dispersants, detergents, friction modifiers, traction improving additives, demulsifiers, defoamants, chromophores (dyes), and/or haze inhibitors. Examples of automotive engine lubricant formulations and additives can be found in U.S. Pat. No. 6,713,438, which is incorporated by reference herein. The fully formulated lubricants can be used in automotive crank case oil (engine oil), industrial oil, grease, or gas turbine engine oil. These are examples of additives used in finished lubricant formulations.

In some embodiments, the syndiotactic polypropylene homopolymers can be used alone or together with other traditional VI improver (e.g., OCP (olefin-copolymer) or polymethacrylates).

The viscosity grade of the lubricating oil can be adjusted by suitable blending of components of differing viscosities. In the lubricating oils herein, the viscosity grade of the lubricating oil can also be adjusted by addition of a suitable amount of the syndiotactic polypropylene homopolymers. As such, the lubricating oil compositions containing the syndiotactic polypropylene homopolymers can have exceptionally good viscometrics, high thickening efficiency, good high temperature high shear performance and acceptable shear stability index.

Without being bound by theory, it is believed that the performance of viscosity modifiers (viscosity index (VI) improvers) can be substantially improved, as measured by the viscometrics and the thickening efficiency (TE) by manipulation of the syndiotactic stereo arrangement of propylene of the viscosity modifier. TE can be defined as efficiency of the amount of a given polymer required to increase base oil kinematic viscosity by a factor of 2 at 100° C., and can be measured by the following equation:

$$TE = 2 * c * \ln(v_{polymer+oil}/v_{oil})/\ln 2$$

where v is kinematic viscosity at 100° C., c is concentration in g/100 g solution.

A lubricating oil including a syndiotactic polypropylene homopolymer may have a thickening efficiency of about 1 to about 4, such as about 1.25 to about 3, such as about 1.25 to about 2.5, such as about 1.7 to about 2.4.

A lubricating oil including a syndiotactic polypropylene homopolymer can have a kinematic viscosity at 40° C., as measured ASTM D445-3, of about 40 cSt to about 100 cSt, such as about 40 cSt to about 80 cSt, such as about 40 cSt to about 60 cSt, such as about 45 cSt to about 55 cSt, alternatively about 80 cSt to about 100 cSt, such as about 85 cSt to about 95 cSt.

A lubricating oil including a syndiotactic polypropylene homopolymer can have a kinematic viscosity at 100° C., as measured by ASTM D445-5, of about 5 cSt to about 20 cSt, such as about 8 cSt to about 15 cSt, such as about 9 cSt to about 11 cSt, alternatively about 11 cSt to about 14 cSt, such as about 12 cSt to about 13.5 cSt.

A lubricating oil including a syndiotactic polypropylene homopolymer can have a high temperature high sheer (HTHS) viscosity (at 150° C. and $10^{-6}$ s$^{-1}$) from about 1 centipoise (cP) to about 4 cP, such as from about 1.25 cP to about 3.75 cP, such as from about 1.5 cP to about 3.5 cP, such as from about 1.75 cP to about 3.5 cP, such as from about 2.5 cP to about 3.5 cP, such as from about 3 cP to about 3.4 cP, as measured at a temperature of 150° C. and a shear rate of $10^6$ s$^{-1}$ according to ASTM D4683 in a Tapered Bearing Simulator and has a unit of centipoise (cP).

A lubricating oil including a syndiotactic polypropylene homopolymer can have shear stability index (SSI) of less than about 70, such as about 20 to about 50, such as about 20 to about 30, alternatively about 30 to about 40, alternatively about 40 to about 50, as determined at 30 cycles (ASTM D6278) using a Kurt Orbahn (KO) diesel injection apparatus. For most viscosity modifiers, SSI value is directly related to the polymer chain length. Higher SSI values correspond to higher molecular weight of a syndiotactic polypropylene homopolymer. Likewise, lower SSI values correspond to lower molecular weight of a syndiotactic polypropylene homopolymer. SSI values are based on viscosity values measured at 100° C. SSI can represent the fraction of viscosity contributed by the viscosity modifier (OCP or EPR) that is lost during shear, and can be measured by the following equation:

$$SSI = 100 \times (V_0 - V_s)/(V_0 - V_b)$$

where $V_0$=viscosity of unsheared oil, $V_s$=viscosity of sheared oil, and $V_b$=viscosity of the base fluid (without polymer). The above equation can be valid only if the degree of thickening ("DT"=$V_0/V_b$) is greater than or equal to 1.2. If the degree of thickening is less than 1.2, SSI cannot be determined from the data as $V_b$ is too close in value to $V_0$ making the denominator in SSI equation approaches 0.

The lubricating oils of the present disclosure can be prepared by dissolving the syndiotactic polypropylene homopolymer in the base oil using any suitable technique. The surface area of solid homopolymer can be increased by, e.g., pelletizing, chopping, grinding or pulverizing the homopolymer. The temperature of the base oil can also be increased by heating using, e.g., steam or hot oil. When the base oil temperature is greatly increased (such as to a temperature above about 100° C.), heating can be conducted under a blanket of a non-reactive gas (e.g., N$_2$). The temperature of the homopolymer can also be raised using, e.g., mechanical energy imparted to the polymer in an extruder or masticator. The homopolymer temperature can be raised to above about 150° C.; the polymer temperature can be raised under a blanket of non-reactive gas, e.g., N$_2$. Dissolution of the homopolymer can also be aided by agitating the mixture of homopolymer and base oil, such as by stirring or agitating (in, e.g., a reactor or a tank), or by using a recirculation pump. Any two or more of the foregoing techniques can also be used in combination. Lubricating oils can also be formed by using the base oil stock as the polymerization solvent in a solution or slurry polymerization processes. This exchange can be accomplished by, e.g., using a distillation column to ensure that the homopolymer is substantially free of polymerization solvent.

Example Base Oils

Oils of lubrication useful as the base oil of the present disclosure may be selected from natural oils, synthetic oils, and/or mixtures thereof, and can be used unrefined, refined, or rerefined (the latter is also known as reclaimed or reprocessed oil). Unrefined oils can include those obtained directly from a natural or synthetic source and used without added purification. These can include shale oil obtained directly from retorting operations, petroleum oil obtained directly from primary distillation, and ester oil obtained directly from an esterification process. Refined oils are similar to the oils discussed for unrefined oils except refined oils are subjected to one or more purification processes to improve at least one lubricating oil property. One skilled in the art is familiar with many purification processes. These processes can include solvent extraction, secondary distillation, acid extraction, base extraction, filtration, and percolation. Rerefined oils include those obtained by processes analogous to refined oils but using an oil that has been previously used as a feed stock.

Natural oils can include animal oils and vegetable oils (e.g., castor oil, lard oil); liquid petroleum oils and hydrorefined, solvent-treated or acid-treated mineral oils of the paraffinic, naphthenic and mixed paraffinic-naphthenic types. Oils of lubricating viscosity derived from coal or shale can also serve as useful base oils.

Synthetic base oils can include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., can constitute another class of known synthetic base oils. These are exemplified by polyoxyalkylene polymers prepared by polymerization of ethylene oxide or propylene oxide, and the alkyl and aryl ethers of polyoxyalkylene polymers (e.g., methylpolyiso-propylene glycol ether having a molecular weight of 1000 or diphenyl ether of poly-ethylene glycol having a molecular weight of 1000 to 1500); and mono- and polycarboxylic esters thereof, for example, the acetic acid esters, mixed $C_3$-$C_8$ fatty acid esters and C13 Oxo acid diester of tetraethylene glycol.

Another suitable class of synthetic lubricating oils can include the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Non-limiting examples of such esters can include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils can also include those made from $C_5$ to $C_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy- or polyaryloxysilicone oils and silicate oils can comprise another useful class of synthetic lubricants; such oils include tetraethyl silicate, tetraisopropyl silicate, tetra-(2-ethylhexyl) silicate, tetra-(4-methyl-2-ethylhexyl)silicate, tetra-(p-tert-butyl-phenyl) silicate, hexa-(4-methyl-2-ethylhexyl)disiloxane, poly(methyl)siloxanes and poly(methylphenyl)siloxanes. Other synthetic lubricating oils can include liquid esters of phosphorous-containing acids (e.g., trieresyl phosphate, trioctyl phosphate, diethyl ester of decylphosphonic acid) and polymeric tetrahydrofurans.

In some embodiments, a base oil can include a Group I, Group II, Group III, Group IV, or Group V oil or blends of the aforementioned oils. For example, the base oil can include a blend of a Group I oil and one or more of Group II, Group III, Group IV, or Group V oil. In some embodiments, the base oil can be a mixture of a Group I oil and one or more a Group II, Group III, Group IV, such as a mixture of a Group I oil and one or more Group II or Group III oil.

Definitions for the oils as used herein are the same as those found in the American Petroleum Institute (API) publication "Engine Oil Licensing and Certification System", Industry Services Department, Fourteenth Edition, December 1996, Addendum 1, December 1998. Group I base oils have a viscosity index of between 80 to 120 and contain greater than 0.03% sulfur and/or less than 90% saturates. Group II base oils have a viscosity index of between 80 to 120, and contain less than or equal to 0.03% sulfur and greater than or equal to 90% saturates. Group III base oils have a viscosity index greater than 120 and contain less than or equal to 0.03% sulfur and greater than 90% saturates. Group IV base oils include polyalphaolefins (PAO). Group V base oils include base oils not included in Groups I-IV. Table 1 below summarizes properties of each of these five groups.

TABLE 1

| | Base Oil Properties | | |
|---|---|---|---|
| Group | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | polyalphaolefins (PAO) | | |
| Group V | All other base oil stocks not included in Groups I, II, III or IV | | |

Lubricant Oil Additives

In some embodiments, a lubricating oil can include one or more additional additives (in addition to syndiotactic polypropylene homopolymer(s)). Such additives can include, but are not limited to, extreme pressure additives, antioxidants, solubility additives, friction modifiers, antifoam agent, dispersants, detergents, corrosion inhibitors, rust inhibitors, metal deactivators, anti-wear agents, anti-seizure agents, wax modifiers, viscosity index improvers, viscosity modifiers, fluid-loss additives, seal compatibility agents, lubricity agents, anti-staining agents, chromophoric agents, demulsifiers, emulsifiers, densifiers, wetting agents, gelling agents, tackiness agents, colorants, or a combination thereof.

In some embodiments, the lubricating oil can include an amount of additional additive(s) (apart from the syndiotactic polypropylene homopolymer(s)) in an amount of about 20 wt % or less, or about 0.1 wt % or more, based on the total weight of the lubricating oil. In at least one embodiment, the amount of such additive(s) in the lubricating oil can be about 0.1 wt % to about 20 wt %, such as about 0.1 wt % to about 10 wt %, such as about 0.1 wt % to about 5 wt %, such as about 0.1 wt % to about 1 wt %, alternatively about 10 wt % to about 20 wt %, such as about 10 wt % to about 15 wt %, alternatively about 15 wt % to about 19 wt %.

Other Additives—Detergents

Illustrative detergents useful in lubricant oils include, for example, alkali metal detergents, alkaline earth metal detergents, or mixtures of one or more alkali metal detergents and one or more alkaline earth metal detergents. A typical detergent is an anionic material that contains a long chain hydrophobic portion of the molecule and a smaller anionic or oleophobic hydrophilic portion of the molecule. The anionic portion of the detergent is typically derived from an organic acid such as a sulfur acid, carboxylic acid, phosphorous acid, phenol, or mixtures thereof. The counterion is typically an alkaline earth or alkali metal.

Salts that contain a substantially stoichiometric amount of the metal are described as neutral salts and have a total base number (TBN, as measured by ASTM D2896) of from 0 to 80. Salts can be overbased, containing large amounts of a metal base that is achieved by reacting an excess of a metal compound (a metal hydroxide or oxide, for example) with an acidic gas (such as carbon dioxide). Useful detergents can be neutral, mildly overbased, or highly overbased. The detergents can be used in mixtures of neutral, overbased, highly overbased calcium salicylate, sulfonates, phenates and/or magnesium salicylate, sulfonates, phenates. The TBN ranges can vary from low, medium to high TBN products, including as low as 0 to as high as 600. Mixtures of low, medium, high TBN can be used, along with mixtures of calcium and magnesium metal based detergents, and including sulfonates, phenates, salicylates, and carboxylates. A detergent mixture with a metal ratio of 1, in conjunction of a detergent with a metal ratio of 2, and as high as a detergent with a metal ratio of 5, can be used. Borated detergents can also be used.

Alkaline earth phenates are another useful class of detergent. These detergents can be made by reacting alkaline earth metal hydroxide or oxide (CaO, Ca(OH)$_2$, BaO, Ba(OH)$_2$, MgO. Mg(OH)$_2$, for example) with an alkyl phenol or sulfurized alkylphenol. Useful alkyl groups include straight chain or branched C$_1$-C$_{30}$ alkyl groups, such as C$_4$-C$_{20}$ or mixtures thereof. Examples of suitable phenols include isobutylphenol, 2-ethylhexylphenol, nonylphenol, or dodecyl phenol. It should be noted that starting alkylphenols may contain more than one alkyl substituent that are each independently straight chain or branched and can be used from 0.5 to 6 weight percent. When a non-sulfurized alkylphenol is used, the sulfurized product may be obtained by any suitable method such as heating a mixture of alkylphenol and sulfurizing agent (including elemental sulfur, sulfur halides such as sulfur dichloride) and then reacting the sulfurized phenol with an alkaline earth metal base.

Metal salts of carboxylic acids are also useful as detergents. These carboxylic acid detergents may be prepared by reacting a basic metal compound with at least one carboxylic acid and removing free water from the reaction product. These compounds may be overbased to produce the desired TBN level. Detergents made from salicylic acid are one class of detergents derived from carboxylic acids. Useful salicylates include long chain alkyl salicylates. One useful family of detergents is of the formula

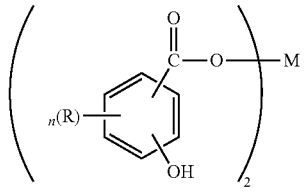

where R is an alkyl group having 1 to 30 carbon atoms, n is an integer from 1 to 4, and M is an alkaline earth metal. Example R groups include alkyl chains of at least C$_{11}$, such as C$_{13}$ or greater. R may be substituted with substituents that do not interfere with the detergent's function. M can be calcium, magnesium, or barium. In some embodiments, M is calcium.

Hydrocarbyl-substituted salicylic acids may be prepared from phenols by the Kolbe reaction (see U.S. Pat. No. 3,595,791). The metal salts of the hydrocarbyl-substituted salicylic acids may be prepared by double decomposition of a metal salt in a polar solvent such as water or alcohol.

Alkaline earth metal phosphates may also be used.

Detergents may be simple detergents or what is known as hybrid or complex detergents. Hybrid detergents can provide the properties of two detergents without the need to blend separate materials. See, for example, U.S. Pat. No. 6,034,039.

Example detergents include calcium phenates, calcium sulfonates, calcium salicylates, magnesium phenates, magnesium sulfonates, magnesium salicylates and other related components (including borated detergents), and mixtures thereof. Example mixtures of detergents include magnesium sulfonate and calcium salicylate, magnesium sulfonate and calcium sulfonate, magnesium sulfonate and calcium phenate, calcium phenate and calcium salicylate, calcium phenate and calcium sulfonate, calcium phenate and magnesium salicylate, calcium phenate and magnesium phenate.

Another family of detergents is oil soluble ashless nonionic detergent. Typical nonionic detergents are polyoxyethylene, polyoxypropylene, polyoxybutylene alkyl ethers, or nonylphenol ethoxylates. For reference, see "Nonionic Surfactants: Physical Chemistry" Martin J. Schick, CRC Press; 2 edition (Mar. 27, 1987). The nonionic detergents are less common in engine lubricant formulations, but offer a number of advantages such as improved solubility in ester base stocks. The nonionic detergents that are soluble in hydrocarbons generally have a Hydrophilic-Lipophilic Balance (HLB) value of 10 or below.

To minimize the effect of ash deposit on engine knock and pre-ignition, including low speed pre-ignition, the detergents can be an ashless nonionic detergent with a Hydrophilic-Lipophilic Balance (HLB) value of 10 or below. These detergents are commercially available from for example, Croda Inc., under the trade designations "ALARMOL PS11E" and "ALARMOL PS15E", from for example the Dow Chemical Co. the trade designation "ECOSURF EH-3", "TERGITOL 15-S-3", "TERGITOL L-61", "TERGITOL L-62", "TERGITOL NP-4", "TERGITOL NP-6", "TERGITOL NP-7", "TERGITOL NP-8", "TERGITOL NP-9", "TRITON X-15", and "TRITON X-35".

The detergent concentration in the lubricating oils of this disclosure can range from 0.5 to 6.0 weight percent, such as 0.6 to 5.0 weight percent or from 0.8 weight percent to 4.0 weight percent, based on the total weight of the lubricating oil.

Other Additives—Dispersants

During engine operation, oil-insoluble oxidation byproducts are produced. Dispersants help keep these byproducts in solution, thus diminishing their deposition on metal surfaces. Dispersants used in the formulation of the lubricating oil may be ashless or ash-forming in nature. In some embodiments, the dispersant is ashless. Ashless dispersants are organic materials that form substantially no ash upon combustion. For example, non-metal-containing or borated metal-free dispersants are considered ashless. In contrast, metal-containing detergents discussed above form ash upon combustion.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

A class of dispersants are the alkenylsuccinic derivatives, typically produced by the reaction of a long chain hydrocarbyl substituted succinic compound, usually a hydrocarbyl substituted succinic anhydride, with a polyhydroxy or polyamino compound. The long chain hydrocarbyl group constituting the oleophilic portion of the molecule which confers solubility in the oil, is normally a polyisobutylene group.

Hydrocarbyl-substituted succinic acid and hydrocarbyl-substituted succinic anhydride derivatives are useful dispersants. In particular, succinimide, succinate esters, or succinate ester amides prepared by the reaction of a hydrocarbon-substituted succinic acid compound may have at least 50 carbon atoms in the hydrocarbon substituent, with at least one equivalent of an alkylene amine are particularly useful, although on occasion, having a hydrocarbon substituent between 20-50 carbon atoms can be useful.

Succinimides are formed by the condensation reaction between hydrocarbyl substituted succinic anhydrides and amines. Molar ratios can vary depending on the polyamine. For example, the molar ratio of hydrocarbyl substituted succinic anhydride to TEPA can vary from 1:1 to 5:1.

Succinate esters are formed by the condensation reaction between hydrocarbyl substituted succinic anhydrides and alcohols or polyols. Molar ratios can vary depending on the alcohol or polyol used. For example, the condensation product of a hydrocarbyl substituted succinic anhydride and pentaerythritol is a useful dispersant.

Succinate ester amides are formed by condensation reaction between hydrocarbyl substituted succinic anhydrides and alkanol amines. For example, suitable alkanol amines include ethoxylated polyalkylpolyamines, propoxylated polyalkylpolyamines and polyalkenylpolyamines such as polyethylene polyamines. One example is propoxylated hexamethylenediamine.

The molecular weight of the hydrocarbyl substituted succinic anhydrides used in the preceding paragraphs will typically range between 800 and 2,500 or more. The above products can be post-reacted with various reagents such as sulfur, oxygen, formaldehyde, carboxylic acids such as oleic acid. The above products can also be post reacted with boron compounds such as boric acid, borate esters or highly borated dispersants, to form borated dispersants generally having from 0.1 to 5 moles of boron per mole of dispersant reaction product.

Mannich base dispersants are made from the reaction of alkylphenols, formaldehyde, and amines. See U.S. Pat. No. 4,767,551. Process aids and catalysts, such as oleic acid and sulfonic acids, can also be part of the reaction mixture. Molecular weights of the alkylphenols range from 800 to 2,500.

Typical high molecular weight aliphatic acid modified Mannich condensation products useful in this disclosure can be prepared from high molecular weight alkyl-substituted hydroxyaromatics.

Exemplary dispersants include borated and non-borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having a Mn of from 500 to 5000, or from 1000 to 3000, or 1000 to 2000, or a mixture of such hydrocarbylene groups, often with high terminal vinylic groups. Other dispersants include succinic acid-esters and amides, alkylphenol-polyamine-coupled Mannich adducts, their capped derivatives, and other related components.

Polymethacrylate or polyacrylate derivatives are another class of dispersants. These dispersants are typically prepared by reacting a nitrogen containing monomer and a methacrylic or acrylic acid esters containing 5-25 carbon atoms in the ester group. Representative examples are shown in U.S. Pat. Nos. 2,100,993, and 6,323,164. Polymethacrylate and polyacrylate dispersants are normally used as multifunctional viscosity index improvers. The lower molecular weight versions can be used as lubricant dispersants or fuel detergents.

The use of polymethacrylate or polyacrylate dispersants may be preferred in polar esters of a non-aromatic dicarboxylic acid, such as adipate esters, since many other conventional dispersants are less soluble. The dispersants for polyol esters in this disclosure may include polymethacrylate and polyacrylate dispersants.

Such dispersants may be used in an amount of 0.1 to 20 weight percent, such as 0.5 to 8 weight percent or 0.5 to 4 weight percent. The hydrocarbon numbers of the dispersant atoms can range from $C_{60}$ to $C_{1000}$, or from $C_{70}$ to $C_{300}$, or from $C_{70}$ to $C_{200}$. These dispersants may contain both neutral and basic nitrogen, and mixtures of both. Dispersants can be end-capped by borates and/or cyclic carbonates.

Still other potential dispersants can include polyalkenyls, such as polyalkenyls with a molecular weight of at least 900 and an average of 1.3 to 1.7 functional groups per polyalkenyl moiety. Yet other suitable polymers can include polymers formed by cationic polymerization of monomers such as isobutene and/or styrene.

Other Additives—Anti-wear Agent

A metal alkylthiophosphate and more particularly a metal dialkyl dithio phosphate in which the metal constituent is zinc, or zinc dialkyl dithio phosphate (ZDDP) is a useful component of the lubricating oils of this disclosure. ZDDP can be derived from primary alcohols, secondary alcohols or mixtures thereof. ZDDP compounds generally are of the formula $Zn[SP(S)(OR^1)(OR^2)]_2$ where $R^1$ and $R^2$ are $C_1$-$C_{18}$ alkyl groups, such as $C_2$-$C_{12}$ alkyl groups. These alkyl groups may be straight chain or branched. Alcohols used in the ZDDP can be 2-propanol, butanol, secondary butanol, pentanols, hexanols such as 4-methyl-2-pentanol, n-hexanol, n-octanol, 2-ethyl hexanol, alkylated phenols, and the like. Mixtures of secondary alcohols or of primary and secondary alcohol may be used. Alkyl aryl groups may be used.

Exemplary zinc dithiophosphates which are commercially available include secondary zinc dithiophosphates such as those available from, for example, The Lubrizol Corporation under the trade designations "LZ 677A", "LZ 1095" and "LZ 1371", from for example Chevron Oronite under the trade designation "OLOA 262" and from for example Afton Chemical under the trade designation "HITEC 7169".

ZDDP is typically used in amounts of from 0.4 weight percent to 1.2 weight percent, such as from 0.5 weight percent to 1.0 weight percent, such as from 0.6 weight percent to 0.8 weight percent, based on the total weight of the lubricating oil, although more or less can often be used advantageously. In some embodiments, the ZDDP is a secondary ZDDP and present in an amount of from 0.6 to 1.0 weight percent of the total weight of the lubricating oil.

More generally, other types of suitable anti-wear additives can include, for example, metal salts of a carboxylic acid. The metal can be a transition metal or a mixture of transition metals, such as one or more metals from Group 10, 11, or 12 of the Periodic Table. The carboxylic acid can be an aliphatic carboxylic acid, a cycloaliphatic carboxylic acid, an aromatic carboxylic acid, or a mixture thereof.

Low phosphorus engine oil formulations are included in this disclosure. For such formulations, the phosphorus content is typically less than 0.12 weight percent, such as less than 0.10 weight percent or less than 0.085 weight percent. Low phosphorus content of the engine oil may be preferred in combination with the friction modifier.

Other Additives—Extreme Pressure Additives

Extreme pressure additives may be incorporated into lubricating oils of this disclosure. The extreme pressure additives may include organic sulfur compounds, organic phosphorus compounds, organic boron compounds, organic sulfur-phosphorus compounds, organic sulfur-phosphorus-boron compounds, organic chloride compounds, or any combination thereof. Some examples of such organic compounds include esters, triglycerides, paraffins, and olefins. Suitable extreme pressure additives for use in lubricating oils of this disclosure include temperature-dependent extreme pressure additives that are configured to react with metallic surfaces under localized high temperature conditions that may exist in mechanisms in which one component of a mechanism exerts sufficient pressure on another component to cause a boundary condition of lubrication. Suitable extreme pressure additives for use in lubricating oils of this disclosure include non-temperature-dependent extreme pressure additives. In some embodiments, the extreme pressure additive content of lubricating oils of the present disclosure may be from about 0.1 wt % to about 30 wt %, or from about 0.1 wt % to about 25 wt %, or from about 0.1 wt % to about 20 wt %.

Other Additives—Viscosity Index Improvers

Viscosity index improvers (also known as VI improvers, viscosity modifiers, and viscosity improvers) can be included in the lubricating oils of this disclosure to adjust the viscosity (higher or lower) of a lubricating oil for a desired purpose of use of the lubricating oil. Viscosity index improvers provide lubricants with high and low temperature operability. These additives impart shear stability at elevated temperatures and acceptable viscosity at low temperatures.

Suitable viscosity index improvers include high molecular weight hydrocarbons, polyesters and viscosity index improver dispersants that function as both a viscosity index improver and a dispersant. Typical molecular weights of these polymers are between about 10,000 to 1.500,000, more typically about 20,000 to 1,200,000, and even more typically between about 50,000 and 1,000,000. The typical molecular weight for polymethacrylate or polyacrylate viscosity index improvers is less than about 50,000.

Examples of viscosity index improvers are linear or star-shaped polymers and copolymers of methacrylate, butadiene, olefins, or alkylated styrenes. Polyisobutylene is a commonly used viscosity index improver. Another viscosity index improver is polymethacrylate (copolymers of various chain length alkyl methacrylates, for example), some formulations of which also serve as pour point depressants. Other viscosity index improvers include copolymers of ethylene and propylene, hydrogenated block copolymers of styrene and isoprene, and polyacrylates (copolymers of various chain length acrylates, for example). Some examples include styrene-isoprene or styrene-butadiene based polymers of 50,000 to 200,000 molecular weight.

In an embodiment of this disclosure, the viscosity index improvers may be used in an amount of from 1.0 to about 20 weight percent, such as 5 to about 15 weight percent or 8.0 to about 12 weight percent, based on the total weight of the formulated oil or lubricating engine oil.

Other Additives—Antioxidants

Antioxidants retard the oxidative degradation of lubricating oils during service. Such degradation may result in deposits on metal surfaces, the presence of sludge, or a viscosity increase in the lubricating oil.

Antioxidants can include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_{6+}$ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include for example hindered 2,6-di-alkyl-phenolic propionic ester derivatives. Bis-phenolic antioxidants may also be advantageously used in combination with the instant disclosure. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4'-methylene-bis(2,6-di-t-butyl phenol).

One or more catalytic antioxidants may also be included in lubricating oils. The catalytic antioxidants comprise a) one or more oil soluble polymetallic organic compounds; and b) one or more substituted N.N'-diaryl-o-phenylenediamine compounds or c) one or more hindered phenol compounds; or a combination of both b) and c).

Non-phenolic oxidation inhibitors which may be used include aromatic amine antioxidants and these may be used either as such or in combination with phenolics. Typical examples of non-phenolic antioxidants include: alkylated and non-alkylated aromatic amines such as aromatic monoamines of the formula $R^8R^9R^{10}N$ where $R^8$ is an aliphatic, aromatic or substituted aromatic group, $R^9$ is an aromatic or a substituted aromatic group, and $R^{10}$ is H, alkyl, aryl or $R^{11}S(O)xR^{12}$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to 20 carbon atoms, such as from 6 to 12 carbon atoms. The aliphatic group is an aliphatic group. In some embodiments, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines antioxidants have alkyl substituent groups of at least 6 carbon atoms. Examples of aliphatic groups include hexyl, heptyl, octyl, nonyl, and decyl. Generally, the aliphatic groups will not contain more than 14 carbon atoms. The general types of amine antioxidants useful in the present compositions include diphenylamines, phenyl naphthylamines, phenothiazines, imidodibenzyls and diphenyl phenylene diamines. Mixtures of two or more aromatic amines are also useful. Polymeric amine antioxidants can also be used. Particular examples of aromatic amine antioxidants useful in the present disclosure include: p,p'-dioctyldiphenylamine; t-octylphenyl-alpha-naphthylamine; phenyl-alphanaphthylamine; and p-octylphenyl-alpha-naphthylamine.

Exemplary amine antioxidants in this disclosure include polymeric or oligomeric amines which are the polymerization reaction products of one or more substituted or hydrocarbyl-substituted diphenyl amines, one or more unsubstituted or hydrocarbyl-substituted phenyl naphthyl amines, or both one or more of unsubstituted or hydrocarbyl-substituted diphenylamine with one or more unsubstituted or hydrocarbyl-substituted phenyl naphthylamine.

Polymeric or oligomeric amines are commercially available from Nyco S.A. under the trade designation of Nycoperf AO337. The polymeric or oligomeric amine antioxidant is present in an amount in the range 0.5 to 10 wt % (active ingredient), such as 2 to 5 wt % (active ingredient) of polymerized aminic antioxidant exclusive of any unpolymerized aryl amine which may be present or any antioxidants, such as sulfurized alkyl phenols or alkali metal salts thereof or alkaline earth metal salts thereof.

Exemplary antioxidants also include hindered phenols or arylamines. These antioxidants may be used individually by type or in combination with one another. Such additives may be used in an amount of 0.01 to 5 weight percent, such as 0.01 to 1.5 weight percent, 0.01 to 1.0 weight percent, or 0.01 to 0.5 weight percent.

Other Additives—Pour Point Depressants (PPDs)

One or more pour point depressant (also known as lube oil flow improvers) may be added to the lubricating oils of the present disclosure if desired. A pour point depressant may be added to lubricating oils of the present disclosure to lower the minimum temperature at which the lubricating oil will flow or can be poured. Examples of suitable pour point depressants include poly alkyl methacrylates, polymethacrylates, polyacrylates, polyarylamides, acrylate-styrene copolymers, esterified olefin copolymers, alkylated polystyrene, vinyl acetate-fumarate copolymers, condensation products of haloparaffin waxes and aromatic compounds, vinyl carboxylate polymers, and terpolymers of dialkylfumarates, vinyl esters of fatty acids and allyl vinyl ethers. Such additives may be used in an amount of about 0.01 to 5 weight percent, such as about 0.01 to 1.5 weight percent.

Other Additives—Seal Compatibility Agents

Seal compatibility agents help to swell elastomeric seals by causing a chemical reaction in the lubricating oil or physical change in the elastomer. Suitable seal compatibility agents for lubricating oils include organic phosphates, aromatic esters, aromatic hydrocarbons, esters (butylbenzyl phthalate, for example), and polybutenyl succinic anhydride. Such additives may be used in an amount of about 0.01 to 3 weight percent, such as about 0.01 to 2 weight percent.

Other Additives—Antifoam Agents

Anti-foam agents may advantageously be added to lubricant compositions. These agents retard the formation of stable foams. Silicones and organic polymers are typical anti-foam agents. For example, polysiloxanes, such as silicon oil or polydimethyl siloxane, provide antifoam properties. Anti-foam agents are commercially available and may be used in amounts along with other additives such as demulsifiers, usually the amount of anti-foam agents is less than 1 wt % and often less than 0.1 wt %, based on the total weight of the lubricating oil.

Other Additives—Inhibitors and Antirust Additives

Antirust additives (or corrosion inhibitors) are additives that protect lubricated metal surfaces against chemical attack by water or other contaminants. A wide variety of these are commercially available.

One type of antirust additive is a polar compound that wets the metal surface preferentially, protecting it with a film of oil. Another type of antirust additive absorbs water by incorporating it in a water-in-oil emulsion so that only the oil touches the metal surface. Yet another type of antirust additive chemically adheres to the metal to produce a non-reactive surface. Examples of suitable additives include zinc dithiophosphates, metal phenolates, basic metal sulfonates, fatty acids and amines. Such additives may be used in an amount of about 0.01 to 5 weight percent, such as about 0.01 to 1.5 weight percent.

Other Additives—Friction Modifiers

A friction modifier is any material or materials that can alter the coefficient of friction of a surface lubricated by lubricating oil containing such material(s). Friction modifiers, also known as friction reducers, or lubricity agents or oiliness agents, and other such agents that change the ability of base stocks or formulated lubricating oil to modify the coefficient of friction of a lubricated surface may be effectively used in combination with the base stocks or lubricant compositions of the present disclosure if desired. Friction modifiers that lower the coefficient of friction are advantageous in combination with the lubricating oils of this disclosure.

Illustrative friction modifiers may include, for example, organometallic compounds. Illustrative organometallic friction modifiers include, for example, molybdenum amine, molybdenum diamine, tungsten compounds (such as an organotungstenate), a molybdenum dithiocarbamate, molybdenum dithiophosphates, molybdenum amine complexes, molybdenum carboxylates, and mixtures thereof.

Other illustrative friction modifiers useful in the lubricating engine oil formulations of this disclosure include, for example, alkoxylated fatty acid esters, alkanolamides, polyol fatty acid esters, borated glycerol fatty acid esters, fatty alcohol ethers, and mixtures thereof.

Illustrative alkoxylated fatty acid esters include, for example, polyoxyethylene stearate, fatty acid polyglycol ester, and the like. These can include polyoxypropylene stearate, polyoxybutylene stearate, polyoxyethylene isostearate, polyoxypropylene isostearate, polyoxyethylene palmitate, and the like.

Illustrative alkanolamides include, for example, lauric acid diethylalkanolamide, and palmic acid diethylalkanolamide. These can include oleic acid diethylalkanolamide, stearic acid diethylalkanolamide, oleic acid diethylalkanolamide, polyethoxylated hydrocarbylamides, or polypropoxylated hydrocarbylamides.

Illustrative polyol fatty acid esters include, for example, glycerol mono-oleate, saturated mono-, di-, and tri-glyceride esters, or glycerol mono-stearate. These can include polyol esters or hydroxyl-containing polyol esters.

Illustrative borated glycerol fatty acid esters include, for example, borated glycerol mono-oleate, borated saturated mono-, di-, and tri-glyceride esters, borated glycerol monostearate, and the like. In addition to glycerol polyols, borated glycerol fatty acid esters can include trimethylolpropane, pentacrythritol, or sorbitan. Esters can be polyol monocarboxylate esters, polyol dicarboxylate esters, or polyoltricarboxylate esters. Esters can be the glycerol mono-oleates, glycerol dioleates, glycerol trioleates, glycerol monostearates, glycerol distearates, and glycerol tristearates and the corresponding glycerol monopalmitates, glycerol dipalmitates, and glycerol tripalmitates, or the respective isostearates, linoleates. Mixtures of esters may also be used. Ethoxylated, propoxylated, butoxylated fatty acid esters of polyols, especially using glycerol as underlying polyol may be used. Illustrative fatty alcohol ethers include, for example, stearyl ether, myristyl ether, and the like. Alcohols, including those that have carbon numbers from $C_3$ to $C_5$, can be ethoxylated, propoxylate, or butoxylated to form the corresponding fatty alkyl ethers. The underlying alcohol portion can be stearyl, myristyl, $C_{11}$-$C_{13}$ hydrocarbon, oleyl, or isosteryl.

Useful concentrations of friction modifiers in lubricating oils may be about 0.01 wt % to about 5 wt %, or about 0.1 wt % to about 2.5 wt %, or about 0.1 wt % to about 1.5 wt %, or about 0.1 wt % to about 1 wt %. Concentrations of molybdenum-containing materials are often described in terms of Mo metal concentration. Advantageous concentrations of Mo may range from 25 ppm to 2000 ppm or more, and sometimes with a range of 50-1500 ppm. Friction modifiers of all types may be used alone or in mixtures with the materials of this disclosure. Often mixtures of two or more friction modifiers, or mixtures of friction modifier(s) with alternate surface active material(s), are used.

When lubricating oils contain one or more additives, each additive is blended into the lubricating oil in an amount sufficient for it to perform its intended function for an application. Additives typically are present in lubricating oils as a minor component, usually at a total additive content of less than 50 wt %, such as less than about 30 wt %, and such as less than about 15 wt %, based on the total weight of the lubricating oils. Each additive is usually present in finished lubricant compositions in an amount of at least 0.01 wt %, such as at least 1 wt %, such as at least 5 wt %. Some additives, such as a detergent package may be present in a finished lubricant composition in an amount of at least 10 wt %. Amounts of additives that may be useful in some embodiments of lubricating oils of the present disclosure are shown in Table 2, below.

The foregoing additives are typically available as commercially available materials. These additives may be added independently, but are usually combined into additive packages that can be obtained from suppliers of lubricant oil additives. Additive packages with a variety of ingredients, proportions, and characteristics are available; selection of the appropriate package will take into account the requisite use of the desired lubricating oil.

Uses of Lubricating Oils

Lubricating oils of the present disclosure may be suitable for use as automotive crank case lubricants, automotive gear oils, transmission oils, marine cylinder oils, marine trunk piston engine oils, passenger vehicle engine oils, commercial vehicle engine oils, lubricants for hybrid vehicles, lubricants for plug-in hybrid vehicles, lubricants for battery electric vehicles, automotive greases, and many industrial lubricants such as circulation lubricants, industrial gear lubricants, onshore wind turbine lubricants, offshore wind turbine lubricants, paper machine oils, industrial greases, compressor oils, pump oils, refrigeration lubricants, hydraulic lubricants, and metal working fluids.

In some embodiments, a lubricating oil of the present disclosure is used as a base oil, a process fluid, a hydraulic fluid, an industrial fluid, or as an automotive gear oil.

In some embodiments, a lubricating oil of the present disclosure is used as an engine oil. Engine oils are intended for use in gasoline engines or diesel engines, and generally contain base stock(s) and additives. Commonly, the base stock is the major component in these lubricating oils, and therefore contributes significantly to the properties of the engine oil. Generally, the wide variety of today's engine oils contain blends of a small number of individual lubricant base stocks and individual additives. Engine oils typically contain 80 wt % or more base oil, the remainder being various additives. Engine oils may contain 85 wt % or more base oil, 90 wt % or more base oil, or 95 wt % or more base oil.

Additional Aspects

The present disclosure provides, among others, the following aspects, each of which may be considered as optionally including any alternate aspects.

Clause 1. A lubricating oil comprising:
at least 50 wt % of a base oil, based on total weight of the lubricating oil; and
at least 0.1 wt % of a polypropylene homopolymer having a racemic dyad content of about 60% to about 99% and a number average molecular weight (by GPC DRI) of about 10,000 g/mol to about 250,000 g/mol, wherein a total amount of the base oil and the polypropylene homopolymer does not exceed 100 wt %.

Clause 2. The lubricating oil of Clause 1, wherein the polypropylene homopolymer has 100 mole % propylene-derived units.

Clause 3. The lubricating oil of Clauses 1 or 2, wherein the lubricating oil comprises about 0.1 wt % to about 15 wt % of the polypropylene homopolymer.

Clause 4. The lubricating oil of any of Clauses 1 to 3, wherein the lubricating oil comprises about 0.5 wt % to about 3 wt % of the polypropylene homopolymer.

Clause 5. The lubricating oil of any of Clauses 1 to 4, wherein the polypropylene homopolymer has a racemic dyad content of about 65% to about 90% as determined by $^{13}$C NMR.

Clause 6. The lubricating oil of any of Clauses 1 to 5, wherein the polypropylene homopolymer has a racemic dyad content of about 68% to about 73%, as determined by $^{13}$C NMR.

Clause 7. The lubricating oil of any of Clauses 1 to 6, wherein the polypropylene homopolymer has:
an [rrrr] pentad content of about 20% to about 65%, as determined by $^{13}$C NMR; and
an [mrrr] pentad content of about 14% to about 23%, as determined by $^{13}$C NMR.

Clause 8. The lubricating oil of any of Clauses 1 to 7, wherein the polypropylene homopolymer has:
an [rrrr] pentad content of about 20% to about 35%, as determined by $^{13}$C NMR; and an [mrrr] pentad content of about 14% to about 20.5%, as determined by $^{13}$C NMR.

Clause 9. The lubricating oil of any of Clauses 1 to 8, wherein the polypropylene homopolymer has:
an [rrrr] pentad content of about 35% to about 65%, as determined by $^{13}$C NMR; and
an [mrrr] pentad content of about 14% to about 20.5%, as determined by $^{13}$C NMR.

Clause 10. The lubricating oil of any of Clauses 1 to 9, wherein the polypropylene homopolymer has:
an [mmmm] pentad content of about 0.1% to about 1.5%, as determined by $^{13}$C NMR;
an [mmmr] pentad content of about 0.7% to about 5%, as determined by $^{13}$C NMR;
an [rmmr] pentad content of about 2% to about 5%, as determined by $^{13}$C NMR;
an [mmrr] pentad content of about 4% to about 10%, as determined by $^{13}$C NMR;
an [mmrm+rmrr] pentad content of about 9% to about 25%, as determined by $^{13}$C NMR;
an [rmrm] pentad content of about 2% to about 10%, as determined by $^{13}$C NMR; and
an [mrrm] pentad content of about 2% to about 7%, as determined by $^{13}$C NMR.

Clause 11. The lubricating oil of any of Clauses 1 to 10, wherein the polypropylene homopolymer has a number average molecular weight (GPC DRI) of about 100,000 g/mol to about 250,000 g/mol.

Clause 12. The lubricating oil of any of Clauses 1 to 11, wherein the polypropylene homopolymer has a weight average molecular weight (GPC DRI) of about 30,000 to about 310,000 g/mol.

Clause 13. The lubricating oil of any of Clauses 1 to 12, wherein the polypropylene homopolymer has:
a weight average molecular weight (GPC DRI) of about 10,000 to about 400,000 g/mol; and a molecular weight distribution ($M_{w,DRI}/M_{n,DRI}$) of about 1.2 to about 2.5.

Clause 14. The lubricating oil of any of Clauses 1 to 13, wherein the polypropylene homopolymer has an intrinsic viscosity ratio ($g'_{vis}$) of about 1.1 to about 1.6.

Clause 15. The lubricating oil of any of Clauses 1 to 14, wherein the polypropylene homopolymer has a melt flow rate of about 0.1 g/10 min to about 700 g/10 min, as determined by ASTM D-1238 (230° C., 2.16 kg).

Clause 16. The lubricating oil of any of Clauses 1 to 15, wherein the polypropylene homopolymer has a melt flow rate of about 2 g/10 min to about 600 g/10 min, as determined by ASTM D-1238 (230° C., 2.16 kg).

Clause 17. The lubricating oil of any of Clauses 1 to 16, wherein the polypropylene homopolymer has a glass transition temperature of about −30° C. to about 10° C., as determined by ASTM D7426 at a scan rate of 10° C./min.

Clause 18. The lubricating oil of any of Clauses 1 to 17, wherein the base oil has a viscosity of about 1.5 cSt to 100 cSt at 100° C. and is selected from a group consisting of a Group I base oil, a Group II base oil, a Group III base oil, a Group IV base oil, or combination(s) thereof.

Clause 19. The lubricating oil of any of Clauses 1 to 18, further comprising an additive selected from a group consisting of a friction modifier, a pour point depressant, a traction improving additive, a defoamant, a haze inhibitor, a pressure additive, an antioxidant, a solubility additive, a dispersant, a detergent, a corrosion inhibitor, a rust inhibitor, a metal deactivator, an anti-wear agent, an anti-seizure agent, a wax modifier, a viscosity modifier, a fluid-loss additive, a seal compatibility agent, a lubricity agent, an anti-staining agent, a chromophoric agent, a demulsifier, an emulsifier, a densifier, a wetting agent, a gelling agent, a tackiness agent, a colorant, and combination(s) thereof.

Clause 20. The lubricating oil of any of Clauses 1 to 19, wherein the lubricating oil comprises a viscosity modifier selected from a group consisting of an olefin-copolymer, a polymethacrylate, or combination(s) thereof.

Clause 21. The lubricating oil of any of Clauses 1 to 20, wherein the lubricating oil has a thickening efficiency of about 0.5 to about 4.

Clause 22. The lubricating oil of any of Clauses 1 to 21, wherein the lubricating oil has a thickening efficiency of about 0.7 to about 2.4.

Clause 23. The lubricating oil of any of Clauses 1 to 22, wherein the lubricating oil has a kinematic viscosity at 40° C. of about 40 cSt to about 100 cSt, as measured ASTM D445-3.

Clause 24. The lubricating oil of any of Clauses 1 to 23, wherein the lubricating oil has a kinematic viscosity at 100° C. of about 5 cSt to about 20 cSt, as measured by ASTM D445-5.

Clause 25. The lubricating oil of any of Clauses 1 to 24, wherein the lubricating oil has a high temperature high sheer (HTHS) viscosity (at 150° C. and $10^{\wedge 6}$ s$^{-1}$) of about 1 cP to about 4 cP, as measured by ASTM D4683.

Clause 26. The lubricating oil of any of Clauses 1 to 25, wherein the lubricating oil has a high temperature high sheer (HTHS) viscosity (at 150° C. and $10^{\wedge 6}$ s$^{-1}$) of about 2 cP to about 3.6 cP, as measured by ASTM D4683.

Clause 27. The lubricating oil of any of Clauses 1 to 26, wherein the lubricating oil has a shear stability index (SSI) of about 1 to about 50, as determined at 30 cycles (ASTM D6278) using a Kurt Orbahn (KO) diesel injection apparatus.

Clause 28. An additive package, comprising:
a polypropylene homopolymer having a racemic dyad content of about 50% to about 99% and a number average molecular weight of about 10,000 g/mol to about 250,000 g/mol; and
one or more additives independently selected from a group consisting of a friction modifier, a pour point depressant, a traction improving additive, a defoamant, a haze inhibitor, a pressure additive, an antioxidant, a solubility additive, a dispersant, a detergent, a corrosion inhibitor, a rust inhibitor, a metal deactivator, an anti-wear agent, an anti-seizure agent, a wax modifier, a viscosity modifier, a fluid-loss additive, a seal compatibility agent, a lubricity agent, an anti-staining agent, a chromophoric agent, a demulsifier, an emulsifier, a densifier, a wetting agent, a gelling agent, a tackiness agent, a colorant, and combination(s) thereof.

Clause 29. The additive package of Clause 28, wherein the additive package comprises a dispersant, a detergent, a friction modifier, an antioxidant, a pour point depressant, a defoamant, a viscosity modifier, an anti-wear agent, and a rust inhibitor.

EXAMPLES

Preparation of Syndiotactic Propylene Polymers

Some syndiotactic polypropylene homopolymers were made using the polymerization conditions listed in Table 4. These polymerizations were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. $H_2$ flowed as a gas under its own pressure through a Brooks flow controller. Propylene and $H_2$ feeds were combined into one stream and then mixed with a pre-chilled isohexane stream that had been cooled to at least 0° C. The mixture was then fed to the reactor through a single line. Scavenger solution (an isohexane solution of tri-n-octylaluminum (TNOA) (25 wt % in hexane, Sigma Aldrich typically fed at a rate of 3.70E-06 mol/min) was also added to the combined solvent and monomer stream just before it entered the reactor to further reduce any catalyst poisons. Similarly, catalyst solution was fed to the reactor using an ISCO syringe pump through a separated line. Isohexane (used as solvent), and monomers (e.g., propylene) were purified over beds of alumina and molecular sieves. Toluene for preparing catalyst solutions was purified by the same technique.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. Polymer properties are also shown in Table 4.

For batch polymerizations, feeds including nitrogen, propylene, isohexane and toluene were purified as described above. Polymerizations were performed in a 2-liter autoclave reactor equipped with a paddle stirrer, an external water jacket for temperature control, a regulated supply of dry nitrogen, propylene, and isohexane, and a septum inlet for the introduction of scavenger and catalyst. The reactor was dried and degassed thoroughly using heat and a dry nitrogen stream prior to polymerization. A typical run consisted of adding isohexane, scavenger (tri-n-octylaluminum), and propylene, and then bringing the reactor to process temperature with stirring at 700 rpm. The pre-catalyst and activator were pre-mixed in 4 ml of toluene in a drybox and loaded into a catalyst addition tube. The tube was attached to the reactor setup, and the catalyst solution was pushed into the reactor using pressurized isohexane. The polymerization reaction was ceased after 20 minutes by rapidly cooling and venting the system. The reactor contents poured into a large beaker and 5 ml of an antioxisdant solution (20 grams of Irganox 1076 in 1 L of toluene) was added and mixed in. Solvent was allowed to evaporate off aided by a strean of nitrogen. The polymer was then dried in a vacuum oven at a temperature of about 90° C. for about 12 hours. The vacuum oven dried samples were weighed to obtain yields. Batch polymerization conditions and characterization are tabulated in Table 5.

For all polymerization experiments, the catalyst used was either di(para-triethylsilylphenyl)methylene(2,7-di-tert-butylfluorenyl)(cyclopentadienyl)hafnium dimethyl (catalyst #1) or di(para-triethylsilylphenyl)methylene(2,7-di-tert-butylfluorenyl)(cyclopentadienyl)zirconium dimethyl (catalyst #2). N,N-dimethylanilinium tetrakis(heptafluoro-2-naphthyl) borate was used as activator for VI additive #1 to #4. N,N-dimethylanilinium tetrakis(pentafluorophenyl) borate was used as activator for VI additive #5 to #28.

TABLE 4

Continuous Reactor Polymerization Runs

| VI additive # | 1 | 2 | 3 | 4 | 5 | 6 |
|---|---|---|---|---|---|---|
| Polymerization temperature (° C.) | 80 | 80 | 80 | 80 | 80 | 80 |
| Propylene feed rate (g/min) | 14 | 14 | 14 | 14 | 14 | 14 |
| Isohexane feed rate (g/min) | 56.7 | 56.7 | 56.7 | 56.7 | 56.7 | 56.7 |
| Catalyst #1 feed rate (mol/min) | 5.298E−07 | 5.298E−07 | 5.298E−07 | 5.298E−07 | 5.298E−07 | 5.298E−07 |
| $H_2$ feed rate (sccm) | 10 | 20 | 30 | 40 | 2.41 | 4.82 |
| Yield (g/min) | 11.08 | 9.97 | 8.21 | 8.21 | 11.00 | 11.82 |
| Conversion (%) | 79.2 | 71.2 | 58.6 | 58.6 | 78.6 | 84.4 |
| Catalyst #1 productivity (kg Poly/kg cat) | 22,165 | 19,945 | 16,415 | 16,410 | 22,005 | 23,640 |
| MFR (g/10 min) | 109.0 | >200 | >200 | >200 | 4.88 | 29.57 |
| Mn_DRI (g/mol) | 45,620 | 29,370 | 20,472 | 16,100 | 118,917 | 76,026 |
| Mw_DRI (g/mol) | 101,543 | 55,089 | 38,622 | 31,182 | 245,845 | 146,312 |
| Mz_DRI (g/mol) | 168,400 | 86,051 | 60,049 | 48,346 | 433,743 | 241,713 |
| MWD (Mw_DRI/Mn_DRI) | 2.23 | 1.88 | 1.89 | 1.94 | 2.06 | 1.92 |
| Mn_LS (g/mol) | 37,094 | 25,988 | 19,711 | 14,643 | 107,179 | 68,955 |
| Mw_LS (g/mol) | 80,191 | 44,624 | 31,347 | 23,992 | 188,123 | 115,790 |
| Mz_LS (g/mol) | 122,019 | 60,229 | 46,660 | 35,843 | 272,884 | 171,653 |
| $g'_{vis}$ (—) | 1.216 | 1.227 | 1.197 | 1.250 | 1.243 | 1.226 |
| Tg (° C.) | −15.55 | −8.20 | −4.24 | −19.15 | −5.16 | −8.96 |
| [mmmm][a] | 0.013 | 0.013 | 0.013 | 0.010 | 0.009 | 0.012 |
| [mmmr][a] | 0.046 | 0.041 | 0.037 | 0.039 | 0.036 | 0.041 |
| [rmmr][a] | 0.043 | 0.041 | 0.041 | 0.039 | 0.041 | 0.044 |
| [mmrr][a] | 0.090 | 0.087 | 0.086 | 0.083 | 0.085 | 0.090 |
| [mmrm + rmrr][a] | 0.217 | 0.211 | 0.207 | 0.204 | 0.221 | 0.227 |
| [rmrm][a] | 0.090 | 0.082 | 0.075 | 0.075 | 0.085 | 0.090 |
| [rrrr][a] | 0.243 | 0.269 | 0.290 | 0.292 | 0.256 | 0.239 |
| [mrrr][a] | 0.199 | 0.203 | 0.202 | 0.206 | 0.207 | 0.202 |
| [mrrm][a] | 0.058 | 0.055 | 0.049 | 0.053 | 0.060 | 0.057 |
| r %[a] | 69.9 | 71.6 | 72.5 | 73.2 | 71.8 | 70.1 |

TABLE 4-continued

Continuous Reactor Polymerization Runs

| VI additive # | 7 | 8 | 9 | 10 | 11 | 12 |
|---|---|---|---|---|---|---|
| Polymerization temperature (° C.) | 80 | 80 | 70 | 70 | 70 | 70 |
| Propylene feed rate (g/min) | 14 | 14 | 14 | 14 | 14 | 14 |
| Isohexane feed rate (g/min) | 56.7 | 56.7 | 56.7 | 56.7 | 56.7 | 56.7 |
| Catalyst #1 feed rate (mol/min) | 5.298E−07 | 5.298E−07 | 5.298E−07 | 5.298E−07 | 5.298E−07 | 5.298E−07 |
| $H_2$ feed rate (sccm) | 7.23 | 10 | 1.21 | 2.41 | 3.62 | 4.82 |
| Yield (g/min) | 11.91 | 12.28 | 10.22 | 11.53 | 11.95 | 12.10 |
| Conversion (%) | 85.0 | 87.7 | 73.0 | 82.3 | 85.3 | 86.4 |
| Catalyst #1 productivity (kg Poly/kg cat) | 23,810 | 24,555 | 20,435 | 23,055 | 23,895 | 24,205 |
| MFR (g/10 min) | 65.12 | 133.50 | 3.98 | 2.70 | 6.01 | 13.14 |
| Mn_DRI (g/mol) | 54,191 | 41,473 | 209,747 | 154,950 | 108,079 | 90,161 |
| Mw_DRI (g/mol) | 110,319 | 91,953 | 441,990 | 306,946 | 223,460 | 175,428 |
| Mz_DRI (g/mol) | 180,092 | 146,335 | 757,810 | 501,485 | 394,842 | 306,866 |
| MWD (Mw_DRI/Mn_DRI) | 2.04 | 2.22 | 2.11 | 1.98 | 2.07 | 1.95 |
| Mn_LS (g/mol) | 50,177 | 42,479 | 192,365 | 146,635 | 95,429 | 73,078 |
| Mw_LS (g/mol) | 87,050 | 73,243 | 342,376 | 249,006 | 167,538 | 135,647 |
| Mz_LS (g/mol) | 129,767 | 109,464 | 507,009 | 370,359 | 241,077 | 205,328 |
| $g'_{vis}$ (—) | 1.222 | 1.210 | 1.313 | 1.294 | 1.273 | 1.258 |
| Tg (° C.) | −2.07 | −3.80 | −1.69 | −4.43 | −3.72 | −3.39 |
| [mmmm]$^a$ | 0.012 | 0.012 | 0.006 | 0.007 | 0.009 | 0.008 |
| [mmmr]$^a$ | 0.041 | 0.042 | 0.026 | 0.029 | 0.031 | 0.031 |
| [rmmr]$^a$ | 0.044 | 0.044 | 0.036 | 0.037 | 0.039 | 0.039 |
| [mmrr]$^a$ | 0.092 | 0.091 | 0.077 | 0.078 | 0.081 | 0.082 |
| [mmrm + rmrr]$^a$ | 0.229 | 0.228 | 0.200 | 0.210 | 0.213 | 0.216 |
| [mmrm]$^a$ | 0.091 | 0.095 | 0.071 | 0.073 | 0.075 | 0.080 |
| [rrrr]$^a$ | 0.234 | 0.223 | 0.324 | 0.310 | 0.295 | 0.282 |
| [mrrr]$^a$ | 0.202 | 0.202 | 0.206 | 0.206 | 0.205 | 0.206 |
| [mrrm]$^a$ | 0.056 | 0.063 | 0.055 | 0.048 | 0.052 | 0.055 |
| r %$^a$ | 69.7 | 69.4 | 75.8 | 74.5 | 73.7 | 73.2 |

| VI additive # | 13 | 14 | 15 | 16 | 17 | 18 |
|---|---|---|---|---|---|---|
| Polymerization temperature (° C.) | 110 | 100 | 90 | 80 | 70 | 60 |
| Propylene feed rate (g/min) | 14 | 14 | 14 | 14 | 14 | 14 |
| Isohexane feed rate (g/min) | 56.7 | 56.7 | 56.7 | 56.7 | 56.7 | 56.7 |
| Catalyst #2 feed rate (mol/min) | 2.34E−07 | 2.34E−07 | 3.27E−07 | 2.34E−07 | 2.34E−07 | 2.34E−07 |
| Yield (g/min) | 1.14 | 1.04 | 2.89 | 1.82 | 2.23 | 2.86 |
| Conversion (%) | 8.1 | 7.4 | 20.6 | 13.0 | 15.9 | 20.4 |
| Catalyst #2 productivity (kg Poly/kg cat) | 9445 | 8656 | 17125 | 15111 | 18536 | 23767 |
| MFR (g/10 min) | >200 | >200 | 265.97 | 52.10 | 18.84 | 5.87 |

| VI additive # | 19 | 20 | 21 | 22 | 23 | 24 |
|---|---|---|---|---|---|---|
| Polymerization temperature (° C.) | 110 | 100 | 90 | 80 | 70 | 60 |
| Propylene feed rate (g/min) | 14 | 14 | 14 | 14 | 14 | 14 |
| Isohexane feed rate (g/min) | 56.7 | 56.7 | 56.7 | 56.7 | 56.7 | 56.7 |
| Catalyst #2 feed rate (mol/min) | 4.87E−07 | 4.87E−07 | 4.87E−07 | 4.87E−07 | 4.87E−07 | 4.87E−07 |
| Yield (g/min) | 3.53 | 4.13 | 4.63 | 5.18 | 5.57 | 6.35 |
| Conversion (%) | 25.2 | 29.5 | 33.0 | 37.0 | 39.8 | 45.3 |
| Catalyst #2 productivity (kg Poly/kg cat) | 14047 | 16438 | 18431 | 20623 | 22207 | 25285 |
| MFR (g/10 min) | >300 | >300 | 306.82 | 80.21 | 21.04 | 5.51 |
| Mn_DRI (g/mol) | 18609 | 25957 | 35860 | 54871 | 65622 | 93561 |
| Mw_DRI (g/mol) | 35243 | 50115 | 68760 | 96400 | 127041 | 174826 |
| Mz_DRI (g/mol) | 54452 | 79237 | 109972 | 150178 | 206408 | 281312 |
| MWD (Mw_DRI/Mn_DRI) | 1.89 | 1.93 | 1.91 | 1.76 | 1.94 | 1.87 |
| Mn_LS (g/mol) | 17027 | 22706 | 29950 | 46451 | 54672 | 75732 |
| Mw_LS (g/mol) | 27277 | 38306 | 51809 | 73913 | 95495 | 130560 |
| Mz_LS (g/mol) | 42856 | 57268 | 76332 | 111141 | 141843 | 194773 |
| $g'_{vis}$ (—) | 1.249 | 1.254 | 1.284 | 1.354 | 1.40 | 1.45 |
| [mmmm]$^a$ | 0.012 | 0.007 | 0.006 | 0.004 | 0.004 | 0.003 |

TABLE 4-continued

Continuous Reactor Polymerization Runs

| | | | | | | |
|---|---|---|---|---|---|---|
| [mmmr]$^a$ | 0.036 | 0.026 | 0.019 | 0.013 | 0.009 | 0.007 |
| [mmrr]$^a$ | 0.043 | 0.036 | 0.031 | 0.026 | 0.023 | 0.021 |
| [mmrr]$^a$ | 0.086 | 0.074 | 0.064 | 0.054 | 0.047 | 0.041 |
| [mmrm + rmrr]$^a$ | 0.216 | 0.205 | 0.182 | 0.153 | 0.122 | 0.091 |
| [rmrm]$^a$ | 0.089 | 0.073 | 0.056 | 0.041 | 0.029 | 0.022 |
| [rrrr]$^a$ | 0.253 | 0.315 | 0.392 | 0.478 | 0.569 | 0.644 |
| [mrrr]$^a$ | 0.206 | 0.208 | 0.204 | 0.190 | 0.166 | 0.144 |
| [mrrm]$^a$ | 0.059 | 0.055 | 0.045 | 0.041 | 0.031 | 0.028 |
| r %$^a$ | 71.3 | 75.4 | 79.3 | 83.3 | 86.5 | 89.3 |

$^a$From $^{13}$C NMR.

TABLE 5

Batch Reactor Polymerization runs

| VI additive # | 25 | 26 | 27 | 28 |
|---|---|---|---|---|
| Polymerization temperature (° C.) | 70 | 80 | 90 | 100 |
| Propylene (ml) | 400 | 400 | 400 | 400 |
| Isohexane (ml) | 800 | 800 | 1000 | 800 |
| Catalyst #2 (mmol) | 0.00934 | 0.00934 | 0.00934 | 0.00934 |
| Activator (mmol) | 0.01024 | 0.01024 | 0.01024 | 0.01024 |
| Scavenger (mmol) | 0.478 | 0.478 | 0.478 | 0.0478 |
| Reaction time (min) | 20 | 20 | 20 | 20 |
| Yield (g) | 142.5 | 123.5 | 147.7 | 187.7 |
| Catalyst #2 Activity (g polymer/mmol cat/hr) | 45,765 | 39,681 | 47,441 | 60,289 |
| MFR (g/10 min) | 13.9 | 22.3 | 108.1 | 324.0 |
| Mn_DRI (g/mol) | 73620 | 63001 | 41690 | 32399 |
| Mw_DRI (g/mol) | 164898 | 131491 | 90265 | 69042 |
| Mz_DRI (g/mol) | 302357 | 227920 | 186375 | 155262 |
| MWD (Mw_DRI/Mn_DRI) | 2.24 | 2.09 | 2.17 | 2.13 |
| Mn_LS (g/mol) | 66993 | 57834 | 38290 | 29077 |
| Mw_LS (g/mol) | 123648 | 101184 | 67645 | 55898 |
| Mz_LS (g/mol) | 208554 | 174659 | 124702 | 141458 |
| g'$_{vis}$ (—) | 1.383 | 1.366 | 1.314 | 1.29 |
| Tg (° C.) | | | -9.89 | -8.87 |
| [mmmm]$^a$ | 0.003 | 0.002 | 0.004 | 0.005 |
| [mmmr]$^a$ | 0.008 | 0.009 | 0.015 | 0.021 |
| [mmrr]$^a$ | 0.021 | 0.022 | 0.027 | 0.032 |
| [mmrr]$^a$ | 0.046 | 0.048 | 0.059 | 0.070 |
| [mmrm + rmrr]$^a$ | 0.099 | 0.116 | 0.163 | 0.186 |
| [rmrm]$^a$ | 0.026 | 0.029 | 0.049 | 0.059 |
| [rrrr]$^a$ | 0.627 | 0.585 | 0.452 | 0.385 |
| [mrrr]$^a$ | 0.144 | 0.161 | 0.193 | 0.200 |
| [mrrm]$^a$ | 0.027 | 0.028 | 0.038 | 0.041 |
| r %$^a$ | 88.3 | 87.0 | 81.8 | 78.4 |

$^a$From $^{13}$C NMR

TABLE 6

Comparative Examples

| VI additive # | C1 | C2 |
|---|---|---|
| Mn_DRI (g/mol) | 51,677 | 41,413 |
| Mw_DRI (g/mol) | 126986 | 92699 |
| Mz_DRI (g/mol) | 218910 | 154003 |
| MWD (Mw_DRI/Mn_DRI) | 2.46 | 2.24 |
| Mn_LS (g/mol) | 52,465 | 44,274 |
| Mw_LS (g/mol) | 119715 | 85020 |
| Mz_LS (g/mol) | 194921 | 130515 |
| Ethylene content by FTIR (wt %) | 42.8 | 45.6 |

Preparing Lubricating Oil

Selected syndiotactic polypropylene produced using the process described above were formulated and tested as viscosity index modifiers in lubricants. The syndiotactic propylenes were blended at about 1.15 wt % concentration (based upon the weight of the final blended solution) and 0.15 wt % Irgonox 1076 and 0.05 wt % Irgofas 168 antioxidants with a Group I mineral oil base Americas CORE 150™ (AC-150™ base oil) at high temperature, such as 130° C. The mixture was stirred until complete dissolution of the propylene polymers and was then cooled to room temperature. The solubility behavior was recorded at room temperature, unless otherwise noted. The polymer solutions were visually checked and only polymer solutions with polymer fully dissolved were subject for further measurements. The formulated oils were then tested for kinematic viscosity (KV40 and KV100), thickening efficiency, SSI and HTHS viscosity according to the procedure described herein. Americas CORE 150™ (AC-150™) is a base stock available from ExxonMobil Chemical Company.

Furthermore, the present disclosure provides a method including blending an oil and syndio-rich PP homopolymer of the present invention to form a composition, and heating the composition at a temperature of about 150° C. or less, such as about 130° C. or less, such as about 100° C. or less, such as from about 50° C. to about 150° C., such as from about 50° C. to about 100° C.

Table 7 illustrates the viscosity modifier blending composition and performance for commercial ethylene propylene copolymers and synthesized PP homopolymers, respectively.

TABLE 7

VM performance testing data with 1.15 wt % of VI additive in AC-150.
1.15 wt % of VI additive in AC-150 Group I Oil

| Formulation Example # | VI additive sample # or ID | KV @ 100° C. (cSt) | KV @40° C. (cSt) | TE | SSI (%) | HTHS (cP) |
|---|---|---|---|---|---|---|
| CF-1 | C1 | 11.83 | Not measured | 2.10 | 30.55 | 3.27 |
| CF-2 | C2 | 10.72 | Not measured | 1.85 | 21.1 | 3.11 |
| F-5 | 5 | 13.11 | 87.44 | 2.36 | 47.1 | 3.41 |
| F-6 | 6 | 10.3 | 66.82 | 1.75 | 28.8 | 3.00 |
| F-25 | 25 | 12.5 | 65.03 | 2.24 | 19.2 | 3.27 |
| F-26 | 26 | 10.78 | 65.47 | 1.87 | 17.5 | 3.12 |
| F-27 | 27 | 8.97 | 61.34 | 1.41 | 9.6 | 2.72 |
| F-28 | 28 | 7.91 | 50.12 | 1.09 | 6.8 | 2.57 |

FIG. 1 is a graph illustrating the high temperature high shear (HTHS) viscosity obtained at a temperature of 150° C. and a shear rate of $10^{\wedge 6}$ $s^{-1}$ vs. kinematic viscosity (KV) at 100° C. and a shear rate of 0.01 $s^{-1}$ for commercial EP copolymers and the syndiorich polypropylene homopolymers, respectively. The value of HTHS is used as a lab predictor for fuel efficiency. At the same KV, the lower the HTHS, the better the fuel efficiency. Most syndiorich polypropylene homopolymer samples show lower HTHS as compared to commercial ethylene-propylene copolymers at similar KVs, indicating lower viscous drag and potential enhanced fuel economy.

Figure 2:
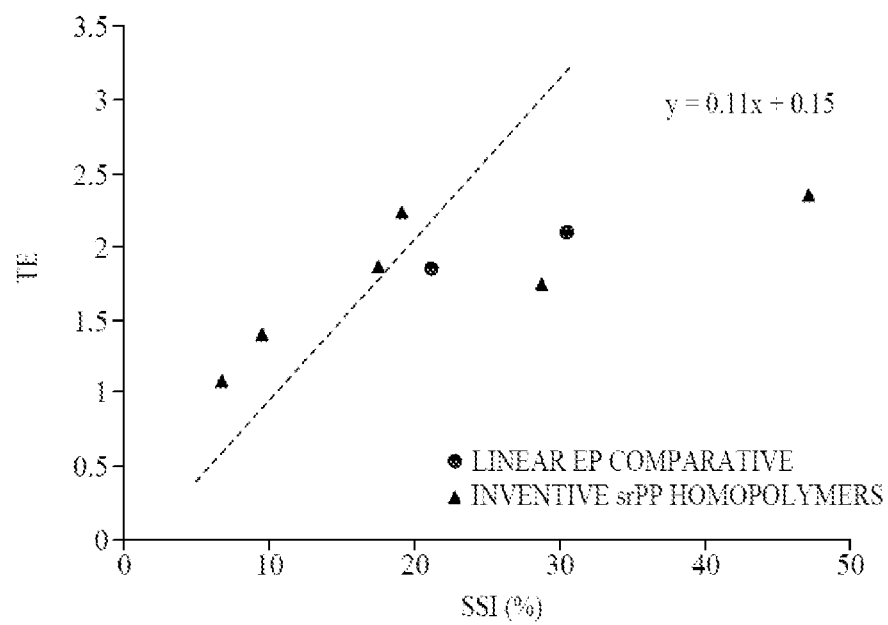
FIG. 2 is a graph illustrating the TE vs SSI for commercial PE copolymers and syndiorich polypropylene homopolymers, according to an embodiment

FIG. 2 is a graph illustrating the TE vs SSI for commercial OCPs and synthesized syndiotactic polypropylene homopolymers, respectively. Most synthesized syndiotactic polypropylene homopolymers show defensive but acceptable TE/SSI as compared to commercial EPs.

Overall, syndiotactic polypropylene homopolymers of the present disclosure promote reduced or eliminated aggregation (e.g., gel or crystallization) in oil formulations which maintains useable viscosity of the oil formulations at a wide range of temperatures. Indeed, syndiotactic polypropylene homopolymers provide alternative polymers that can be used as a viscosity index improver for lubricating oils that exhibit good viscometrics, high thickening efficiency, good high temperature high shear performance, and acceptable shear stability index.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All numerical values within the detailed description herein are modified by "about" the indicated value, and take into account experimental error and variations that would be expected by a person having ordinary skill in the art.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

We claim:

1. A lubricating oil comprising:
    at least 50 wt % of a base oil, based on total weight of the lubricating oil; and
    at least 0.1 wt % of a polypropylene homopolymer having a racemic dyad content of about 60% to about 99% and a number average molecular weight (by GPC DRI) of about 10,000 g/mol to about 250,000 g/mol, wherein a total amount of the base oil and the polypropylene homopolymer does not exceed 100 wt %.

2. The lubricating oil of claim 1, wherein the polypropylene homopolymer has 100 mole % propylene-derived units.

3. The lubricating oil of claim 1, wherein the lubricating oil comprises about 0.1 wt % to about 15 wt % of the polypropylene homopolymer.

4. The lubricating oil of claim 3, wherein the lubricating oil comprises about 0.5 wt % to about 3 wt % of the polypropylene homopolymer.

5. The lubricating oil of claim 1, wherein the polypropylene homopolymer has a racemic dyad content of about 65% to about 90% as determined by $^{13}$C NMR.

6. The lubricating oil of claim 5, wherein the polypropylene homopolymer has a racemic dyad content of about 68% to about 73%, as determined by $^{13}$C NMR.

7. The lubricating oil of claim 1, wherein the polypropylene homopolymer has:
   an [rrrr] pentad content of about 20% to about 65%, as determined by $^{13}$C NMR; and
   an [mrrr] pentad content of about 14% to about 23%, as determined by $^{13}$C NMR.

8. The lubricating oil of claim 7, wherein the polypropylene homopolymer has:
   an [rrrr] pentad content of about 20% to about 35%, as determined by $^{13}$C NMR; and
   an [mrrr] pentad content of about 14% to about 20.5%, as determined by $^{13}$C NMR.

9. The lubricating oil of claim 7, wherein the polypropylene homopolymer has:
   an [rrrr] pentad content of about 35% to about 65%, as determined by $^{13}$C NMR; and
   an [mrrr] pentad content of about 14% to about 20.5%, as determined by $^{13}$C NMR.

10. The lubricating oil of claim 7, wherein the polypropylene homopolymer has:
    an [mmmm] pentad content of about 0.1% to about 1.5%, as determined by $^{13}$C NMR;
    an [mmmr] pentad content of about 0.7% to about 5%, as determined by $^{13}$C NMR;
    an [rmmr] pentad content of about 2% to about 5%, as determined by $^{13}$C NMR;
    an [mmrr] pentad content of about 4% to about 10%, as determined by $^{13}$C NMR;
    an [mmrm+rmrr] pentad content of about 9% to about 25%, as determined by $^{13}$C NMR;
    an [rmrm] pentad content of about 2% to about 10%, as determined by $^{13}$C NMR; and
    an [mrrm] pentad content of about 2% to about 7%, as determined by $^{13}$C NMR.

11. The lubricating oil of claim 1, wherein the polypropylene homopolymer has a number average molecular weight (GPC DRI) of about 100,000 g/mol to about 250,000 g/mol.

12. The lubricating oil of claim 1, wherein the polypropylene homopolymer has a weight average molecular weight (GPC DRI) of about 30,000 to about 310,000 g/mol.

13. The lubricating oil of claim 1, wherein the polypropylene homopolymer has:
    a weight average molecular weight (GPC DRI) of about 10,000 to about 400,000 g/mol; and
    a molecular weight distribution ($M_{w,DRI}/M_{n,DRI}$) of about 1.2 to about 3.0.

14. The lubricating oil of claim 1, wherein the polypropylene homopolymer has an intrinsic viscosity ratio ($g'_{vis}$) of about 1.1 to about 1.6.

15. The lubricating oil of claim 1, wherein the polypropylene homopolymer has a melt flow rate of about 0.1 g/10 min to about 700 g/10 min, as determined by ASTM D-1238 (230° C., 2.16 kg).

16. The lubricating oil of claim 15, wherein the polypropylene homopolymer has a melt flow rate of about 2 g/10 min to about 600 g/10 min, as determined by ASTM D-1238 (230° C., 2.16 kg).

17. The lubricating oil of claim 1, wherein the polypropylene homopolymer has a glass transition temperature of about −30° C. to about 10° C. and does not exhibit a melting temperature, as determined by ASTM D7426 at a scan rate of 10° C./min.

18. The lubricating oil of claim 1, wherein the base oil has a viscosity of about 1.5 cSt to 100 cSt at 100° C. and is selected from a group consisting of a Group I base oil, a Group II base oil, a Group III base oil, a Group IV base oil, or combination(s) thereof.

19. The lubricating oil of claim 18, further comprising an additive selected from a group consisting of a friction modifier, a pour point depressant, a traction improving additive, a defoamant, a haze inhibitor, a pressure additive, an antioxidant, a solubility additive, a dispersant, a detergent, a corrosion inhibitor, a rust inhibitor, a metal deactivator, an anti-wear agent, an anti-seizure agent, a wax modifier, a viscosity modifier, a fluid-loss additive, a seal compatibility agent, a lubricity agent, an anti-staining agent, a chromophoric agent, a demulsifier, an emulsifier, a densifier, a wetting agent, a gelling agent, a tackiness agent, a colorant, and combination(s) thereof.

20. The lubricating oil of claim 19, wherein the lubricating oil comprises a viscosity modifier selected from a group consisting of an olefin-copolymer, a polymethacrylate, or combination(s) thereof.

21. The lubricating oil of claim 18, wherein the lubricating oil has a thickening efficiency of about 0.5 to about 4.

22. The lubricating oil of claim 21, wherein the lubricating oil has a thickening efficiency of about 0.7 to about 2.4.

23. The lubricating oil of claim 18, wherein the lubricating oil has a kinematic viscosity at 40° C. of about 40 cSt to about 100 cSt, as measured ASTM D445-3.

24. The lubricating oil of claim 23, wherein the lubricating oil has a kinematic viscosity at 100° C. of about 5 cSt to about 20 cSt, as measured by ASTM D445-5.

25. The lubricating oil of claim 18, wherein the lubricating oil has a high temperature high sheer (HTHS) viscosity (at 150° C. and $10^{-6}$ $s^{-1}$) of about 1 cP to about 4 cP, as measured by ASTM D4683.

26. The lubricating oil of claim 25, wherein the lubricating oil has a high temperature high sheer (HTHS) viscosity (at 150° C. and $10^{-6}$ $s^{-1}$) of about 2 cP to about 3.6 cP, as measured by ASTM D4683.

27. The lubricating oil of claim 25, wherein the lubricating oil has a shear stability index (SSI) of about 1 to about 50, as determined at 30 cycles (ASTM D6278) using a Kurt Orbahn (KO) diesel injection apparatus.

28. An additive package, comprising:
    a polypropylene homopolymer having a racemic dyad content of about 50% to about 99% and a number average molecular weight of about 10,000 g/mol to about 250,000 g/mol; and
    one or more additives independently selected from a group consisting of a friction modifier, a pour point depressant, a traction improving additive, a defoamant, a haze inhibitor, a pressure additive, an antioxidant, a solubility additive, a dispersant, a detergent, a corrosion inhibitor, a rust inhibitor, a metal deactivator, an anti-wear agent, an anti-seizure agent, a wax modifier, a viscosity modifier, a fluid-loss additive, a seal compatibility agent, a lubricity agent, an anti-staining agent, a chromophoric agent, a demulsifier, an emulsifier, a densifier, a wetting agent, a gelling agent, a tackiness agent, a colorant, and combination(s) thereof.

29. The additive package of claim 28, wherein the additive package comprises a dispersant, a detergent, a friction modifier, an antioxidant, a pour point depressant, a defoamant, a viscosity modifier, an anti-wear agent, and a rust inhibitor.

* * * * *